July 15, 1969 C. I. PEDDLE 3,456,238

CHECKING CIRCUITRY FOR INFORMATION HANDLING APPARATUS

Filed Nov. 30, 1965 17 Sheets-Sheet 1

INVENTOR.
CHARLES I. PEDDLE
BY Warren F.B. Lindsley
ATTORNEY

July 15, 1969 C. I. PEDDLE 3,456,238

CHECKING CIRCUITRY FOR INFORMATION HANDLING APPARATUS

Filed Nov. 30, 1965 17 Sheets-Sheet 3

CHECKING CIRCUITRY FOR INFORMATION HANDLING APPARATUS

CLOCK GENERATOR AND BIT COUNTER

PARITY CALCULATOR LOGIC

ERROR READ LOGIC

TIMING CHART - READ OPERATION - PARITY CHECKING

TIMING CHART-READ OPERATION
SINGLE CHARACTER

TIMING CHART-READ OPERATION
DOUBLE CHARACTER MODE-FIRST CHARACTER

TIMING CHART-READ OPERATION
DOUBLE CHARACTER MODE-SECOND CHARACTER

United States Patent Office
3,456,238
Patented July 15, 1969

3,456,238

CHECKING CIRCUITRY FOR INFORMATION HANDLING APPARATUS

Charles I. Peddle, Phoenix, Ariz., assignor to General Electric Company, a corporation of New York Filed Nov. 30, 1965, Ser. No. 510,485
Int. Cl. G08b *29/00;* G11c *19/00*
U.S. Cl. 340—146.1 19 Claims

ABSTRACT OF THE DISCLOSURE

An information handling system wherein each bit of information transferred to it is examined to determine whether it has been correctly received and wherein a signal is produced if any one bit is found to be in error.

TABLE OF CONTENTS

| | Column |
|---|---|
| General Description | 1 |
| Statement of the Invention | 1 |
| Brief Description of Drawings | 2 |
| Glossary and Index of Signals | 3 |
| Data Processing System | 4 |
| Tape Reader | 4 |
| Tape Punch | 5 |
| Tape Parameters | 5 |
| 5 Level Code | 6 |
| 6 Level Code | 6 |
| 7 Level Code | 6 |
| 8 Level Code | 6 |
| Plugboard | 6 |
| Tape Channel Exit Hubs | 6 |
| Data Entry Hubs | 7 |
| Double Character (DC) Hubs | 7 |
| Parity Hubs | 8 |
| AND-Gate Entries and Exit Hubs | 8 |
| Delete-Stop-EOF Hubs | 8 |
| Inverter-Gate-Flip-Flop Hubs | 8 |
| Logic Components | 8 |
| Shift Register | 9 |
| Flip-Flop | 9 |
| AND-Gates | 10 |
| OR-Gates | 10 |
| Clock Generator and Bit Counter | 11 |
| Description of Read Tape Mode of Operation | 12 |
| Parity Checking | 13 |
| Single Character Read Operation | 14 |
| Single Character Transfer Operation | 15 |
| Double Character Transfer Operation | 16 |
| Description of Punch Tape Mode of Operation | 17 |
| Single Character Punch Operation | 18 |
| Double Character Punch Operation | 19 |

This invention relates to information handling apparatus of the type associated with error detection, and more particularly, to apparatus for manipulating digital data for use in an error detection and correction scheme for perforated tape reader-punch subsystems.

In information processing systems of the electronic type, the information is handled and manipulated at very high speeds and is frequently in the form of time spaced electrical pulses arranged in predetermined code form to represent the numerals and characters being processed. Each numeral or character may be represented in a binary type notation where each code comprises preselected combinations of "ones" and "zeros." Each element of the code may be designated as a binary digit or bit. The handling and manipulation of the information in an information processing system may involve, among other things, the transfer of the data within the processing system, or may involve the writing of the information into some storage medium and the subsequent reading of the information therefrom back to the system or to some output device. As utilized herein, the terms information and data are synonymous.

In the case of a data transfer within the processing system, it is always possible that, due to transient voltages within the transfer equipment, or a failure of the equipment, the data will be transferred in error. In event that data is to be written into some storage medium, or read therefrom, there is again the possibility that some condition on the medium, or in the associated circuits, may exist which will cause the data to be in error the next time the data is needed. Recognizing that such failures can and do occur in the data processing systems, various checking schemes have been used for continually checking the information being transmitted without disrupting the operation.

Error detection as disclosed herein involves the appending to an informational data group of bits, a check or parity bit which is representative of the data making up the informational data group. This check or parity bit is representative of the number of ones and zeroes in the digitally coded information.

In accordance with the teaching of this invention, an information handling apparatus is provided wherein each bit of information transferred to it is examined to determine whether it has been correctly received. A signal is produced if any one bit is found to be in error. The information is then manipulated for transfer out in one of a plurality of selectable groups and a parity bit is generated for each group formed. The apparatus provided achieves multi-use of its component parts in a manner which assures complete protection of the manipulated data.

It is, therefore, one object of this invention to provide digital data processing apparatus in which data is manipulated in accordance with a new scheme wherein each bit of data is checked to insure that all steps of a data manipulation are performed without error.

Another object of this invention is to provide an improved data processing system wherein the manipulations performed by such apparatus are checked on a bit by bit basis.

A further object of this invention is to provide a novel arrangement of logic circuits wherein a shift register is utilized in data manipulation to selectively check the transfer of data.

Further objects and advantages of the present invention will become apparent to those skilled in the art as the description thereof proceeds.

Brief Description of Drawings

The present invention may be more readily described by reference to the accompanying drawing in which.

Glossary and index of signals

Figure 1:
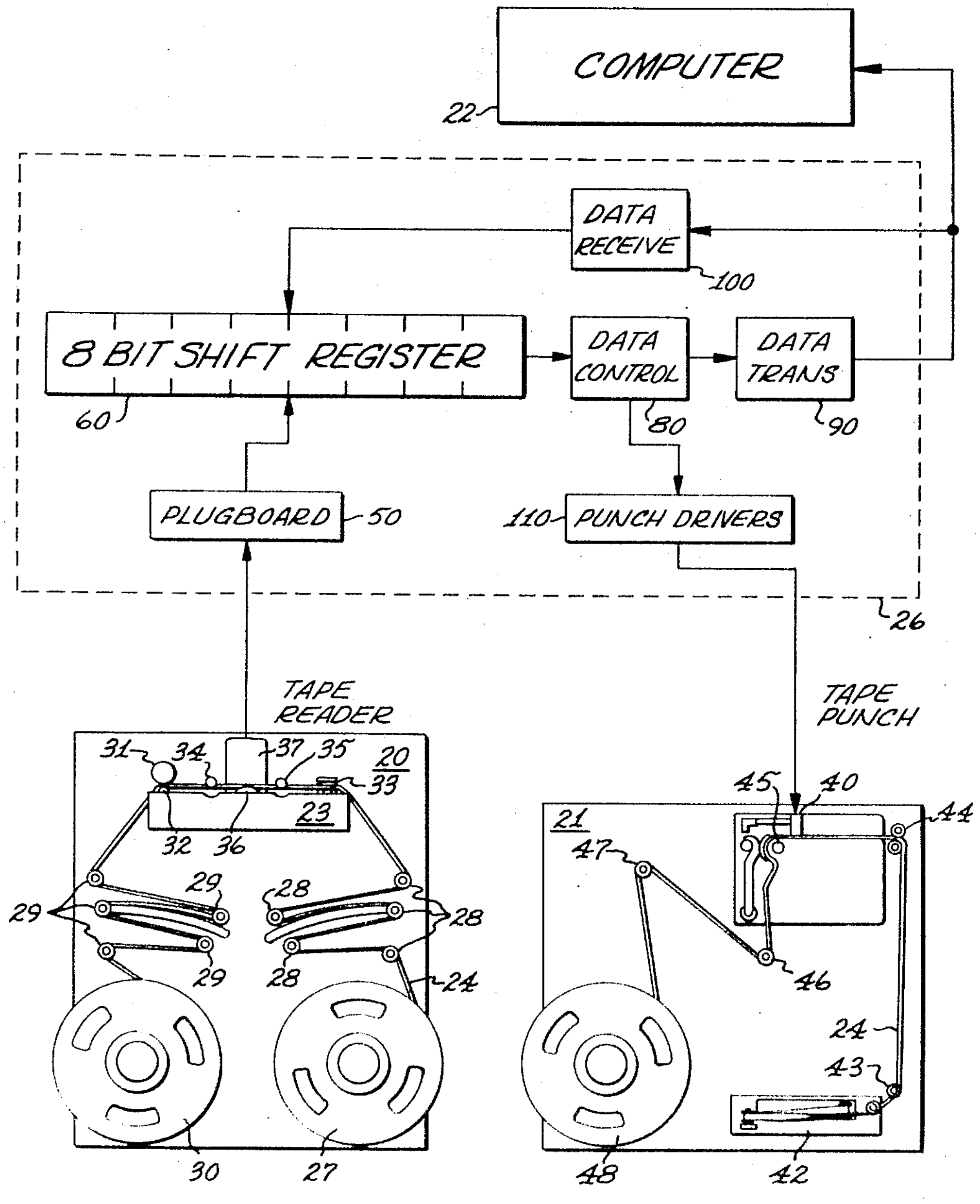
FIG. 1 is a simplified block diagram of a data processing system for transferring information from one location to another and embodying the invention.

In order to more readily understand the disclosed invention, the signals provided by the various system circuit elements are tabulated below:

| Signals: | Description of Signals |
|---|---|
| Bit 1 | 1 bit signal from flip-flop FKS0. |
| Bit 3 | 1 bit signal from flip-flop FKS2. |
| 1st Char. | Flip-flop signal indicating first character. |
| 2nd Char. | Flip-flop signal indicating second character. |
| $\overline{\text{2nd Char.}}$ | Not second character. |
| DTC0 | Count 0 in bit counter. |
| DTC1 | Count 1 in bit counter. |
| DTC2 | Count 2 in bit counter. |
| DTC3 | Count 3 in bit counter. |
| DTC4 | Count 4 in bit counter. |
| DTC5 | Count 5 in bit counter. |
| DTC6 | Count 6 in bit counter. |
| DTC7 | Count 7 in bit counter. |
| $\overline{\text{DTC7}}$ | Not count 7 in bit counter. |
| End of sample | End of sprocket signal. |
| Even par. | Plugboard signal indicating even parity. |
| FCO (0–2) | Bit counters 0 through 2. |
| FKSC | Shift control signal. |
| FKS (0–7) | Shift register stages 0 through 7. |
| FKPC | Parity calculator flip-flop. |
| FKPG | Parity check. |
| FOPR | Reset signal for shift register. |
| FPH7 | Punch mode. |
| FPH6 | Punch single character mode. |
| FPH8 | Double character mode. |
| $\overline{\text{FPH8}}$ | Not double character mode. |
| Odd par. | Plugboard signal indicating odd parity. |
| PHSR | Sprocket hole signal. |
| $\overline{\text{PHSR}}$ | Not sprocket hole signal. |
| QCX11 | Start clock generator signal. |
| QFRC | Master clock generator signals. |
| QKSC | Counter and shift register clock signals. |
| Read | Signal derived from Read command of program. |
| Reset | Reset signal. |
| RDCR | Read response signal from computer. |
| RDCW | Write response signal from computer. |
| RDC6 | Parity signal from computer. |
| REAX | Transmit signal to computer. |
| REWX | Write request signal to computer. |
| Shift Enable | Signal initiating shift operation. |

DATA PROCESSING SYSTEM

The present invention relates to data processing systems and more particularly to paper tape reader-punch structures for transferring data to and receiving data from a central processor. Since it is believed to be unnecessary to describe the well-known details of these devices to completely describe the invention, block diagrams will be used where possible. However, even though known details will be eliminated, a basic description of the entire system will be presented to enable one skilled in the art to understand the environment in which the present invention is placed.

Accordingly, reference is made to FIG. 1 which shows diagrammatically a data processing system including means for transferring information to and from data processing equipment. In the data processing system disclosed, a tape reader 20 and tape punch 21 are provided for transferring to and receiving data from a central processor such as, for example, computer 22. Tape reader 20 comprises means for reading tape at the rate of 250 to a 1000 characters per second from 5, 6, 7 or 8 channel punched paper tape and tape punch 21 comprises means for punching tape at the rate of 150 or more characters per second.

Generally speaking, the structure disclosed is a perforated tape subsystem employing a controller unit 26 comprising control and synchronization circuitry, automatic error detection features and series/parallel data conversion. The reader and punch structures serve as input and output terminals for the controller unit.

The data processing system operates by sending to and receiving data from computer 22 or by transmitting data between the reader and punch structures. The controller unit automatically maintains half-duplex line control between the reader and punch structures and computer 22. Data presented to reader 20 in the form of rolls of perforated tape is converted by a read head structure of reader 20 to electrical signals for computer input under control of a program of computer 22, control panel switches on the computer, or a plugboard.

Data flow in the Read mode of the subsystem is from the read head structure of reader 20 through photocell amplifiers (not shown), plugboard 50, into an eight bit shift register 60. The data is then shifted into data control logic in block 80 from which it is transmitted through the data transmit logic in block 90 to computer 22.

In the Punch mode of operation of the subsystem, data flow from computer 22 is through the data receive logic in block 100 into shift register 60, to the data control logic in block 80, then through the punch drivers in block 110 to the tape punch structure.

Tape Reader

Tape reader 20 comprises a read head structure 23 employing a light source and nine photodiodes, one diode corresponding to each of eight possible tape channels and a sprocket hole channel. An elongated tape 24 is disposed upon a supply reel 27, passing over a plurality of resiliently biased guide rollers 28, through the read head structure, over a plurality of resiliently biased guide rollers 29 to a take-up reel 30. Guide rollers 28 and 29 buffer tape shock and vibration particularly during starting and stopping movements of the tape. The tape is actuated by a drive assembly including a capstan 31 and a cooperating pinch roller 32 and is governed or controlled by a brake assembly 33, and a pair of tape guides or rollers 34 and 35.

It is the purpose of the above described terminal to move the tape past the read head structure 23 so that information which is contained on the tape may be read therefrom. In order that this information transfer may be properly accomplished, the tape must pass the read head structure at a uniform rate of speed. To provide this movement, capstan 31 is rotated at a constant speed in a clockwise direction. Capstan 31 and reels 27 and 30 are given rotary motion through suitable motor drive means (not shown) which are well known in the art. When it is desired to move the tape, pinch roller 32 associated with capstan 31 is actuated by suitable means (not shown) so that it maintains the tape in frictional engagement with the rotating capstan. The tape reader structure described is illustrative only of one type of mechanism suitable to perform a tape reading operation and is not intended to limit the invention in any way to the particular structure shown.

Tape Punch

The tape punch 21 comprises an apparatus for advancing tape 24 past a suitable punch head structure 40. The punch head structure comprises eight pins and a sprocket drum (not shown) for punching the sprocket holes all selectively controlled for perforating tape 24. The perforations or holes punched into tape 24 represent the data transferred to tape punch 21 from tape reader 20 or computer 22. Sprocket holes are normally formed in the tape during the same punching operation in which the data holes are punched and serve to facilitate feeding of the tape during that operation. These holes are, therefore, present throughout the length of the tape and no information or data holes are punched until such time as a sufficient length of tape has been punched with sprocket holes only to form a leader. This leader is simply a length of tape which permits the operator to thread the tape from its storage reel across the punch head structure 40 to a second storage or take-up reel.

Tape 24 in punch 21 is disposed upon a reel (not shown) which is mounted within a spool tray in housing 42 and is fed from housing 42, over guide roller 43, through tape guide rollers 44, through the punch head structure 40, over the sprocket drive 45 which engages the sprocket holes punched in the tape by the punch head structure and guide rollers 46 and 47 to a take-up reel 48. These rollers and sprocket drive hold the tape firmly in place until it reaches the take-up reel 48 which winds tape as fast as it is punched.

TAPE PARAMETERS

Figure 2:
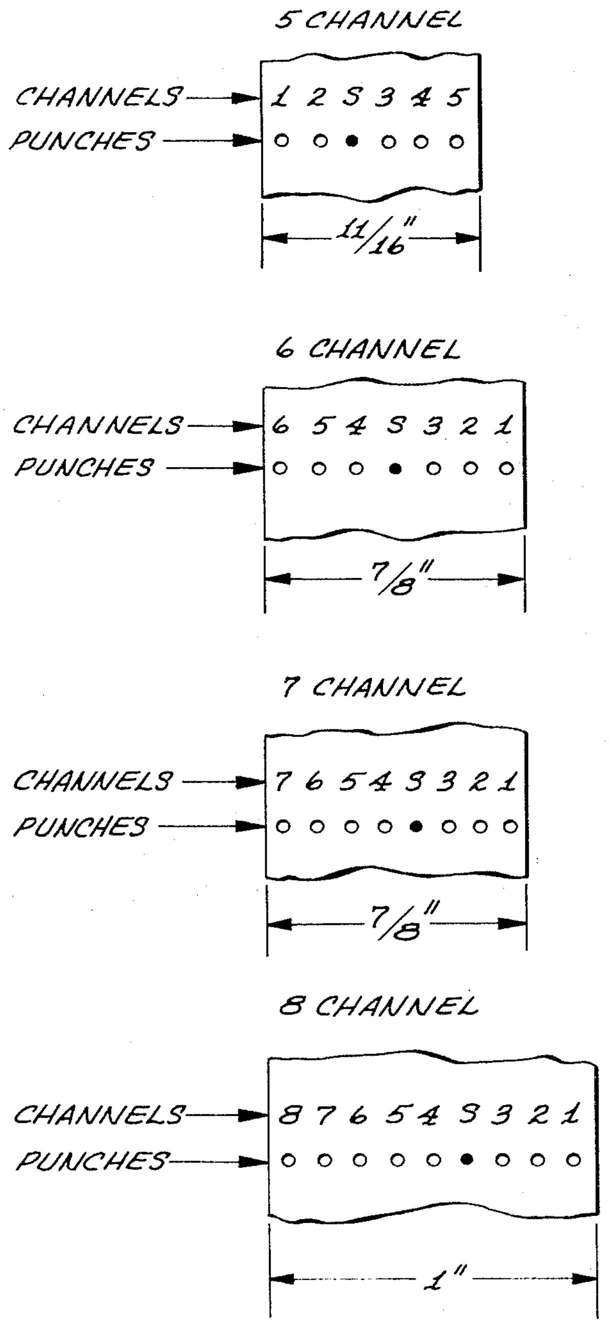
FIG. 2 is a diagrammatic view of 5, 6, 7 and 8 channel tape formats.

FIGURE 2 illustrates the formats for 5, 6, 7 and 8 channel perforated tapes such as might be utilized in the implementation of the present invention. The tape may be made of any suitable material, such as for example, paper or thin flexible plastic and will normally have a width in the range of from ½ to one inch in size. While the length of the tape will be determined by a number of factors including the physical capabilities of the apparatus upon which the tape is used, one common tape length is a thousand feet.

As viewed in FIG. 2, the small hole labeled "S" in each of the formats is a sprocket hole which is not intended to represent a data bit. These sprocket holes extend the full length of the tape. Channels in paper tape are the longitudinal rows extending along the length of the tape wherein holes may be punched. These channels are usually referred to by number as indicated across the tops of the tape fragments shown in FIG. 2. Information is recorded in each channel by either punching a hole or leaving the position unpunched. Each hole in the tape represents a 1-bit sent to or received from computer 22 during a tape reading or punching operation. A code character is read from each frame in the tape. A "frame" is the combination of holes and spaces in a transverse column of one or more channels.

Punch configurations on paper tape can represent numbers, letters, or symbols. They can also, in such applications as numerical control of machine tools, represent an instruction to a control system. For example, a tape character may tell the system to perform some action, such as move a cutting tool a certain distance in a specified direction.

As noted from FIG. 2, the term "channel" is applied to the various physical arrangements of the holes in a tape, such as 5 channel or 8 channel tapes. The term "code" as used herein is defined as a system for the meaningful representation of data on the tapes. The term "level" as applied herein is particularly directed to codes. Code levels are assigned to paper tape channels, such as 5, 6, 7 or 8 level codes.

5 Level Code

Although there may be great flexibility in the use of paper tape codes, there are some codes which are considered to be more or less standard. One of these codes is the 5 level code which has been in use in the communication field ever since the code was introduced in the year 1870. The 5 channel paper tape used with the 5 level code is often generated by off-line tape equipment such as a teletype structure. In the reading and punching of 5 level code, no parity bit is punched on or read from the tape. In the subsystem disclosed, the 5 level code is under control of the plugboard and is always transferred out as a six bit code with the sixth bit determined by the plugboard.

6 Level Code

The 6 level code is not widely used at the present time and is not considered a standard code. Six channels are punched in the paper tape. This particular code is usually used with no parity checking features.

7 Level Code

The 7 and 8 level codes are generally used in industry today. The 7 level code is normally utilized in error checking schemes since a parity bit may be added to any channel and normally channel 5 of the paper tape is used during the tape punching operation. A parity bit shows that the register transferring information to the paper tape punch structure contains an even number of one bits. This makes the total number of holes in a paper tape frame odd. The use of channel 5 for parity checking prevents its use of data purposes. If the seventh channel is not used for a parity bit but is used for a data bit, then the 7 level code in the subsystem disclosed is transferred out of the subsystem in the form of two characters.

8 Level Code

The 8 level code is substantially identical to the 7 level code and the tape is read in the same manner as a tape containing the 7 level code.

PLUGBOARD

As shown in FIG. 1, a plugboard 50 controls the interpretation and transfer of information read from tape 24 to computer 22. The plugboard is wired by the operator to indicate, among other things, whether one or two machine characters are to be generated for each tape character read for transfer to computer 22 and whether odd or even parity is to be checked for the tape characters read.

Figure 3:
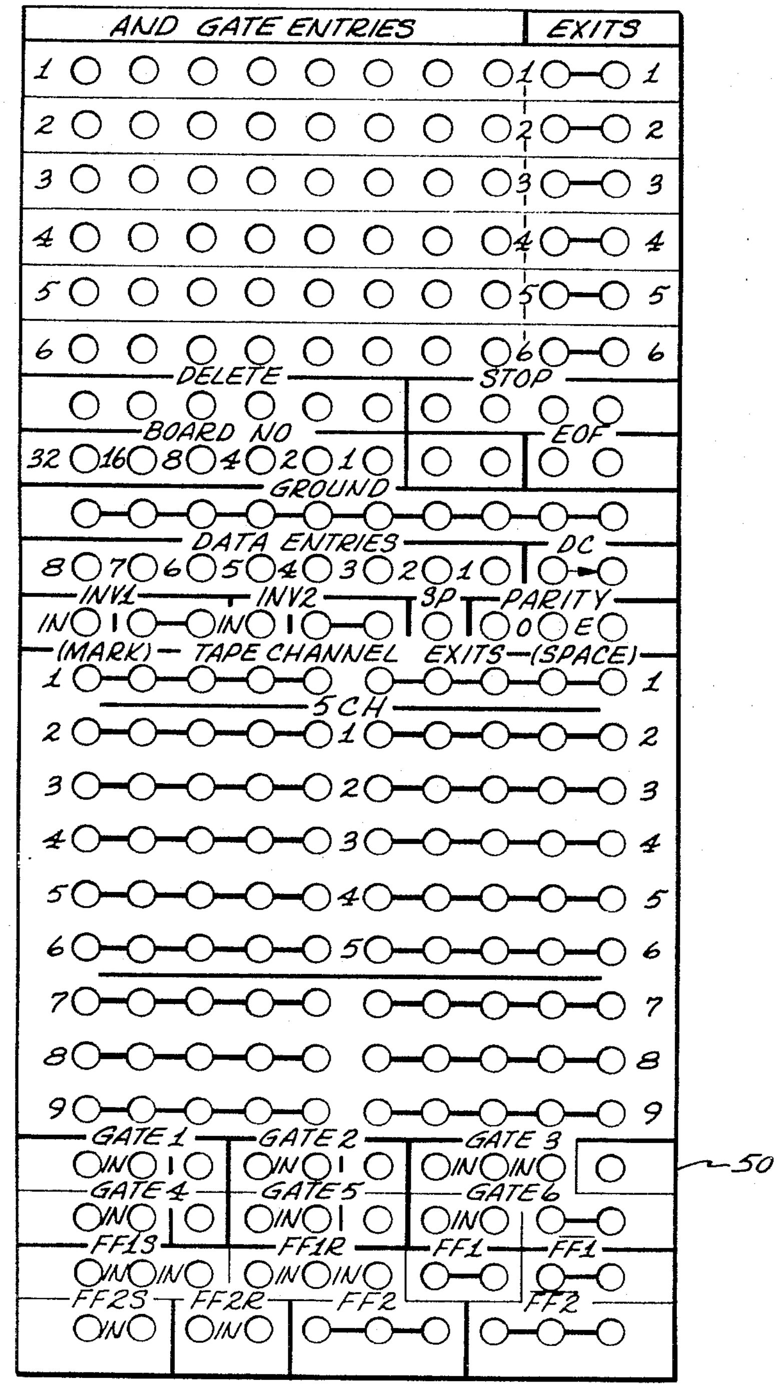
FIG. 3 illustrates a plugboard structure showing its functional areas.

FIGURE 3 illustrates a plugboard structure showing its functional areas, each of which provides a control function for the tape reading operation. For all tape reading operations, the Tape Channel Exit hubs and the Data Entry hubs must be wired. If the tape contains a channel punch configurations or 7 channel punch configurations with no parity punch, the double character DC hubs must also be wired.

Tape Channel Exit Hubs

Data read from the perforated tape is transferred to the plugboard through the Tape Channel Exit hubs and from there is routed to other plugboard functions. The Tape Channel Exit section of the plugboard is divided in half: the part on the left labeled "Mark" is used to designate a punch in the tape character; the part on the right labeled "Space" is used to designate a non-punch in the tape character. This section is then further divided into eight horizontal rows of hubs, corresponding directly to the rows of 6, 7 and 8 channel tapes. The numerals shown in the center of the Tape Channel Exit section designate the rows when using 5 channel tape.

The Tape Channel Exit hubs are wired to only the Data Entry hubs and the AND-Gate Entry hubs. The particular connection of the Data Entry hubs indicates how the data read from tape is inserted into the memory of computer 22. A Mark hub from each row corresponding to the channels of the tape being read is plugged into the desired Data Entry hub. When connected to the AND-Gate Entry hubs, the Tape Channel Exit wiring defines the configuration of the specific character being searched for.

Data Entry Hubs

Figure 4:
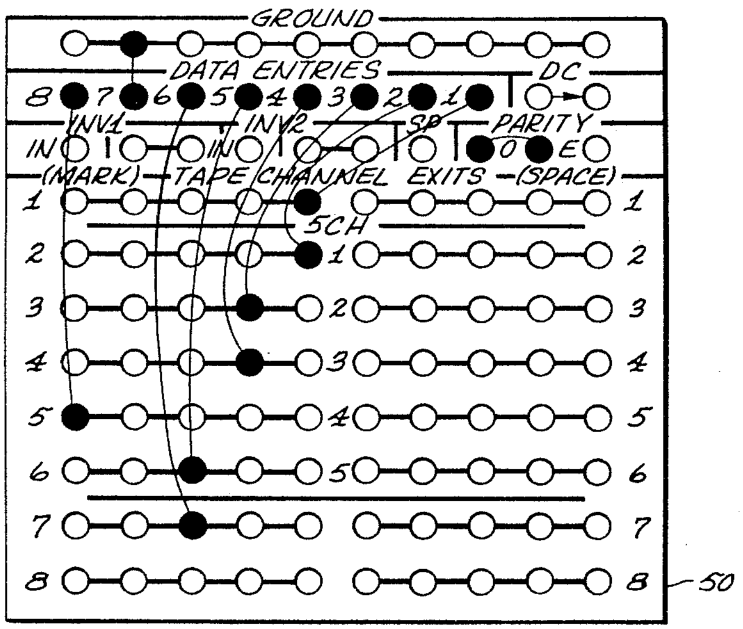
FIG. 4 illustrates a portion of the plugboard structure shown in FIG. 3 with some of its hubs wired.

The Data Entry section of the plugboard contains eight hubs. These hubs, when wired to the Tape Channel Exit hubs, determine how the punched characters, ranging from 5 channel to 8 channel tapes, are to be represented in the processing system's memory by 6-bit characters. Data Entry hub 1 represents the least significant bit of a memory character while Data Entry hub 6 represents the most significant bit. When reading data in the double character mode, Data Entry hubs 7 and 8 represent the two least significant bits of the first 6-bit character of the two memory characters transmitted to the processing system. Thus, if tape channel 1 is to be treated as the least significant bit of the character, Data Entry hub 1 as shown in FIG. 4 must be wired to a Mark hub in row 1 of the Tape Channel Exit hubs; however, if tape channel 1 is to be treated as the third bit of the character, Data Entry hub 3 must be wired to a Mark hub in row 1 of the Tape Channel Exit hub. Whenever punch parity is indicated on the tape in a channel such as channel 5 of a 7 channel tape, the Tape Channel Exit hub of that row must be wired to Data Entry hub 7 or 8 where it will not be transmitted to the processing system. The Tape Channel Exit hub for the next row (row 6) is wired to Data Entry hub 5, as shown in FIG. 4. Any unused Data Entry hubs must be wired to the Ground hubs. Thus, when reading 5 channel tape, the three unoccupied Data Entry hubs must be wired to three Ground hubs.

Even though Data Entry hubs 7 and 8 are plugged for reading 8 channel tape or 7 channel tape with no parity, they will be ignored unless the double character DC portion of the plugboard is also activated.

Double Character (DC) Hubs

The two double character DC hubs must be wired together whenever 7 channel tape without parity or 8 channel tape is being read. This causes two memory characters to be transmitted to the processing system for each tape character read.

Figure 5:
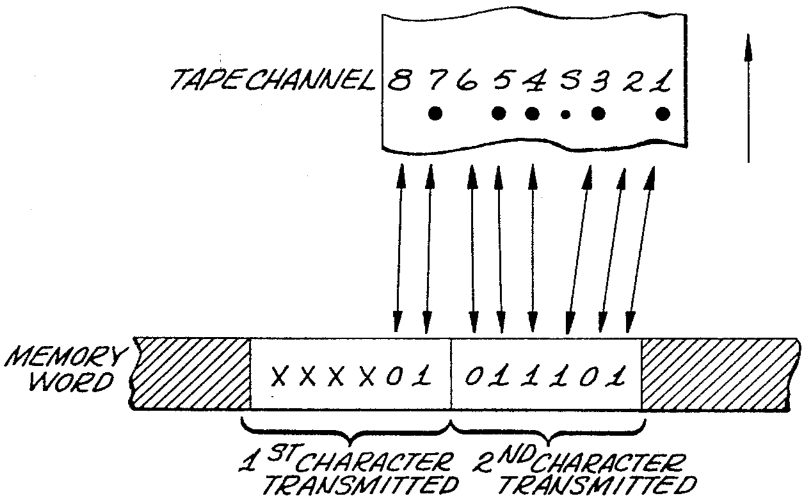
FIG. 5 illustrates diagrammatically the transfer of 8 level coded information from an 8 channel tape to memory of a computer.

The first data character transmitted to the processing system will be a character whose two least significant bits will be transmitted to the memory of computer 22 through Data Entry hubs 7 and 8, respectively. The remaining bits of that character are automatically filled with zeros by the processing system. The second character transmitted to the processing system will be a data character, the bits of which will be transmitted through Data Entry hubs 6–1. Thus, if the Data Entry hubs are wired so that the order of bits is not altered, an 8 channel tape character would appear in the memory of computer 22 as shown in FIG. 5. If the tape is a 7 channel tape with a parity bit, the DC hubs may be wired together, thus causing each tape character to be treated as two memory characters with the program of the computer masking out the parity bit so it is not transferred to the memory of computer 22. When reading 5 or 6 channel tape, the DC hubs are not connected together.

Parity Hubs

The Parity hubs shown in FIGS. 3 and 4 are used to specify the type of parity check, if any, to be performed on 7 and 8 channel tapes. If the plugboard is to check for odd parity (that is, the number of holes in a tape character including the parity hole must be odd), the Parity hub labeled 0 must be connected to the center Parity hub as shown in FIG. 4. To check for even parity (an even number of holes in the tape character including the parity hole), the hub labeled E in FIGS. 3 and 4 must be connected to the center Parity hub. If the Parity hubs are not wired, no parity check is made.

AND-Gate Entries and Exit Hubs

The AND-Gate hubs permit a defined character, when encountered by the tape reader to initiate one or more other plugboard functions. Six rows of AND-Gate hubs are provided, each row consisting of eight Entry hubs and two Exit hubs. The row of AND-Gate Entry hubs is connected to the Tape Channel Exit hubs which represent any tape character configuration from 5 to 8 bits in length. Any unused hubs in the AND-Gate row do not affect the character being sensed. The two Exit hubs associated with each row of AND-Gate Entry hubs allow the character configuration specified to be connected to other plugboard hubs for controlling other tape reader operations. These hubs are identified in FIG. 3 as the Delete, Stop, EOF, INV (inverter input), Gate input and FF (flip-flop) input hubs.

Delete-Stop-EOF Hubs

The Delete area of the plugboard contains six hubs, any one of which causes the deletion of a specific character and may be connected to the AND-Gate, INV (inverter), Gate, or FF (flip-flop) Exit hubs of the plugboard.

The plugboard shown contains four Stop hubs. Whenever any one of these hubs is activated, transmission of data to the computer 22 or punch 21 terminates immediately. Even though operation has halted, the stop character just read will be transmitted to the processing system unless that character is also wired to the Delete section of the plugboard. The Stop hubs may be wired from any of the AND-Gate, Inverter Gate or Flip-flop Exit hubs.

Two EOF hubs are provided on the plugboard, either of which indicates end-of-file status. These hubs may be wired from any of the AND-Gate, Inverter Gate or Flip-flop Exit hubs.

Inverter-Gate-Flip-Flop Hubs

Both sets of Inverter hubs contain an input hub labeled IN and two unmarked output hubs. The INV 1 and INV 2 hubs can invert the Exit hub output state of a plugboard function when the opposite state is needed to activate another area of the plugboard. The Inverter hubs can be used to expand the output capability of the plugboard function when more exits are required.

The six sets of Gate hubs, each comprising two input hubs and either one or two output hubs, provide a means for generating a plugboard function which will be activated only when two other functions are activated.

The FF section of the plugboard provides flip-flop capabilities so that one plugboard occurrence may be remembered and through a Gate hub be combined with a later occurrence to activate still another plugboard function.

Figure 6:
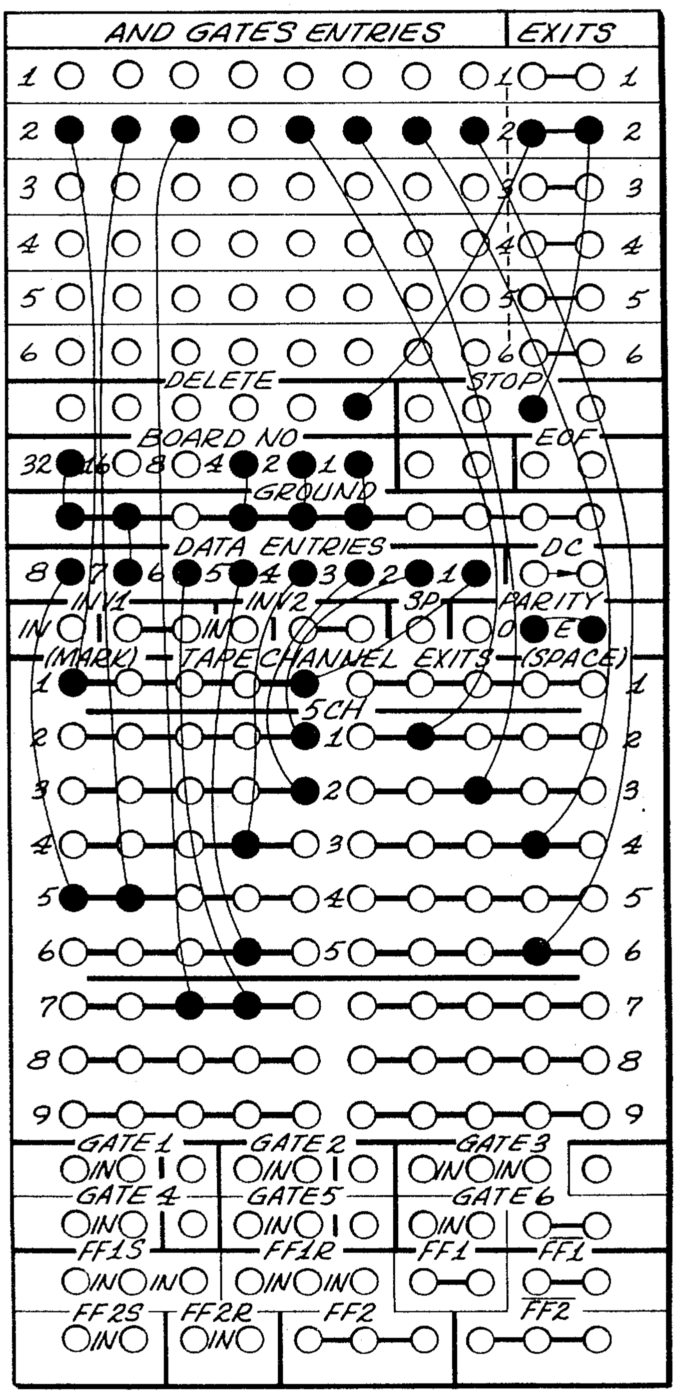
FIG. 6 illustrates a typical wiring of the plugboard structure shown in FIG. 3.

FIGURE 6 illustrates a typical plugboard wiring arrangement.

LOGIC COMPONENTS

In the perforated tape reader-punch subsystem disclosed, the tape reader and punch structures operate independently of each other. When the subsystem receives a command from a computer program to read tape, terminal 20 is activated causing tape to be fed from reel 27 through the read head area past read head structure 23 to the take-up reel 30 at the rate of 50 inches per second or more. This causes 500 or more characters to be read per second. If the tape is positioned so that the leader is under the read head structure 23 when the first Read command of the computer program is received, the tape reader 20 automatically moves the tape to the first data character. As the tape passes through the read head, the punch holes representing data cause light from the light source 36 to activate corresponding photodiodes 37. These photodiodes, when activated, send electronic signals representative of data read to the reader's plugboard 50. At the plugboard, the signals are examined to see whether they correspond to any configurations wired into the plugboard for special action and, inter alia, whether odd or even parity is to be checked.

From the plugboard the signals are arranged in proper order for transmission through an eight bit shift register 60, where parity may be checked. When arranged for parity checking, the subsystem continually checks itself to determine that no condition has arisen to hamper or diminish the quality of the reading or punching operation. If such a condition is detected, signals are generated indicating the error or faulty condition.

Figure 7:
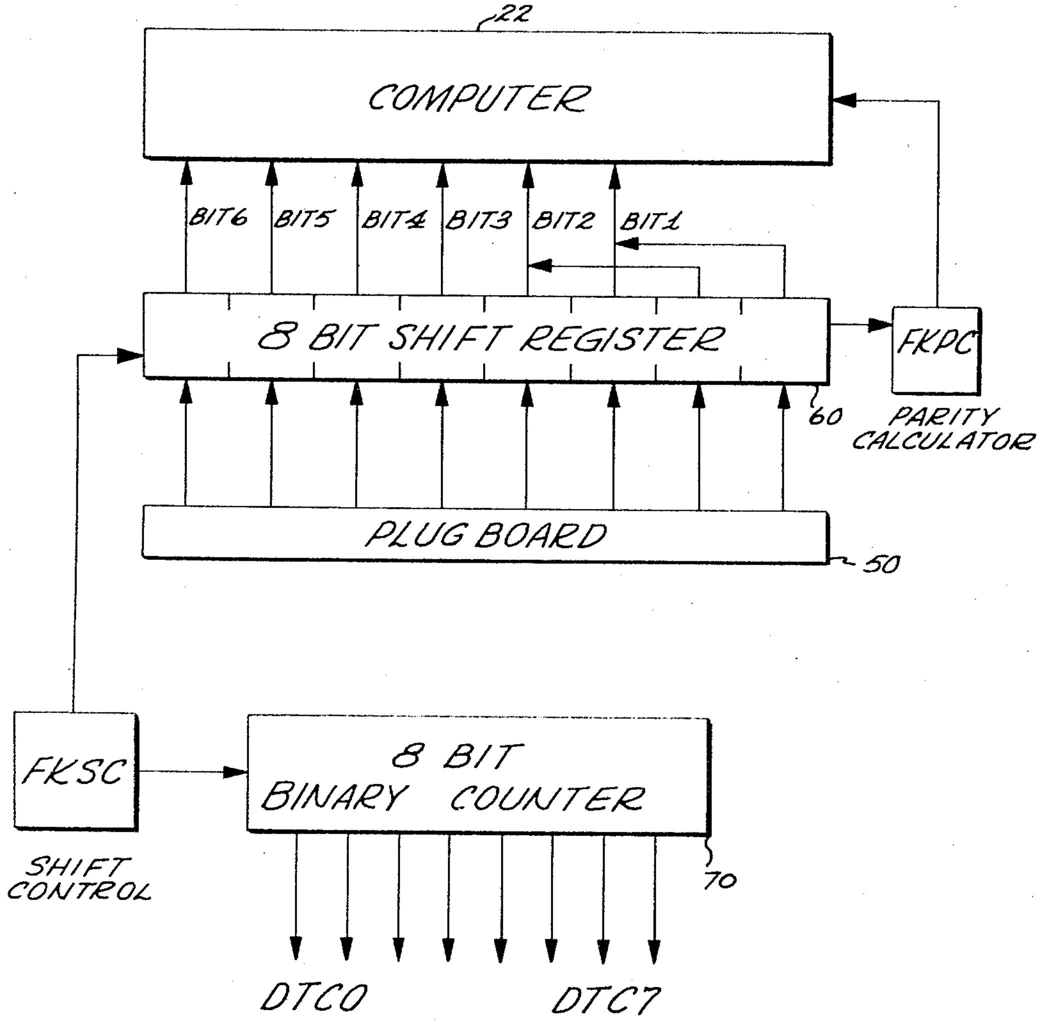
FIG. 7 is an expanded partial view of the block diagram shown in FIG. 1 illustrating data flow from the tape reader to the computer.

FIGURE 7 is an expansion of a part of the block diagram of FIG. 1 showing in more detail the logic components for checking the accuracy of data read from tape 24, manipulating the data into a plurality of bit groups and generating a parity bit for each group before the data is transmitted to computer 22.

Assume for purposes of illustration that reader 20 has a 7 or 8 column punched paper tape loaded into it and wishes to transmit a block of information to computer 22. Since the perforated tape subsystem is continually aware of the various conditions existing within it, its status information is automatically transferred to the computer when requested by its program. Thus, when a perforated tape subsystem is placed in the Read mode by the program, signals corresponding to the perforated tape coded characters are received by the reader. The data originating in the tape reader from a reading of tape 24 is amplified by photo amplifiers (not shown) to standard logic levels before being transferred to shift register 60. Before being transferred to shift register 60, the binary data passes through plugboard 50 where a number of data conditions as heretofore explained may be interrogated. Signals representing the data bits read from the perforated tape are transmitted in parallel from the plugboard to shift register 60 as shown in FIGS. 1, 7 and 8.

Shift Register

Figure 8:
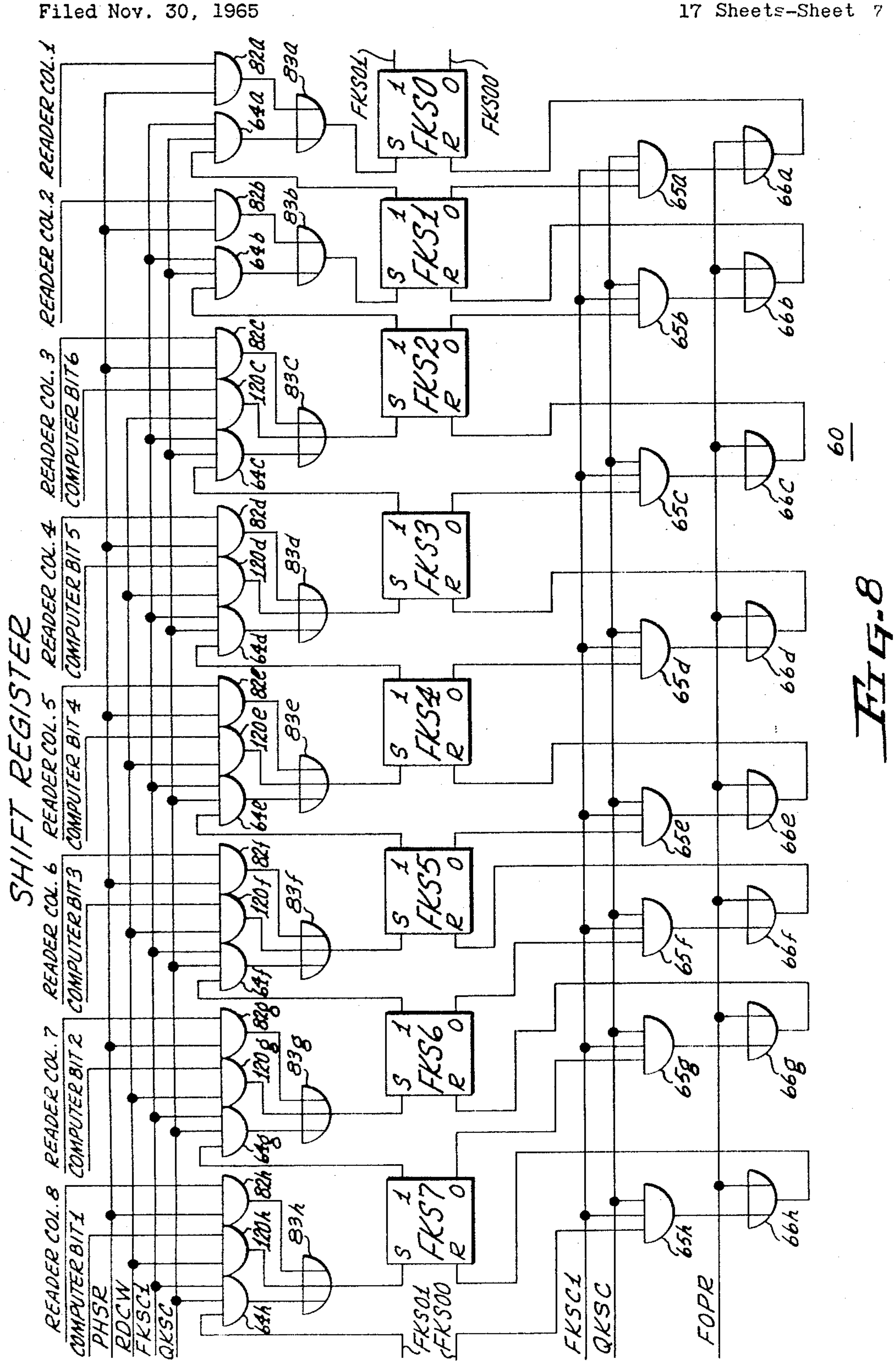
FIG. 8 is a schematic block diagram of the shift register logic shown in FIGS. 1, 7 and 17.

The shift register shown in FIGS. 1, 7 and 8 comprises eight flip-flops for storing information punched on the paper tape, one flip-flop for each bit of the data to be stored therein. The flip-flops of the registers are identified according to the register designation and a numerical significance of the data bits stored therein. Thus, the flip-flops of shift register 60 are designated FKS0 through FKS7.

Shift register 60 as well as circuits in the other logic blocks forming a part of the controller unit 26 comprises a plurality of logic components. A general description of these components will be given; however, since most of them are well known in the art, the description will be amplified only in those areas where it is felt necessary to provide a clear understanding of the invention disclosed.

Flip-Flop

The flip-flop or bistable multivibrators referred to in the specification, and shown, for example, in FIG. 8 of the drawings, are circuits adapted to operate in either one of two stable states and to tranfer from the state in which they are operating to the other stable state upon the application of a trigger signal thereto. In one state of operation, the flip-flop represents the binary 1 (1-state) and in the other state, the binary 0 (0-state). The two leads entering the left-hand side of the flip-flop symbols FKS0 through FKS7, shown in FIG. 8, provide the two required trigger signals. The upper input leads, the set input leads, provide the set signals and the lower input leads, the reset input leads, provide the reset input signals. When the set input signals go positive, the flip-flops are transferred to their 1-states, if they are not already in the 1-state. When the reset input signals go positive, the flip-flops are transferred to their 0-states, if they are not already in their 0-state. The two leads leaving the right-hand side of the flip-flop symbols deliver the two output signals for each flip-flop. The upper output leads, the 1-output leads, deliver the 1-output signals of the flip-flops and the lower output leads, the 0-output leads, deliver the 0-output signals.

AND-Gates

The AND-gates disclosed in the drawings and particularly in FIG. 8 provide the logical operation of conjunction of binary 1 signals applied thereto. In the system disclosed, since the binary 1 is represented by a positive signal, the AND-gates provide a positive output signal representing a binary 1, when, and only when, all of the input signals applied thereto are positive and represent binary 1's. The symbol identified by the numerals **82*a* and 82*b*, inter alia, in FIG. 8, represents two input AND-gates. Such AND-gates deliver the binary 1 output signal only when each of the two input signals applied thereto represents a binary 1. A three input AND-gate, such as representative by AND-gates 64*a* and 65*a***, delivers a binary 1 output only when each of the three input signals applied thereto represents a binary 1.

OR-Gates

The OR-gates disclosed in FIG. 8 provide the logical operation of inclusive-OR for binary 1 input signals applied thereto. In the system, since binary 1 is represented by a positive signal, the OR-gate provides a positive output signal representing a binary 1 when any one or more of the input signals applied thereto are positive and represent binary 1's. The symbol identified by gates 66 and 67 in FIG. 8 represents two input OR-gates. These OR-gates deliver a binary 1 output signal when any one or both input signals applied thereto represent binary 1's.

From the plugboard 50, the data bits are transferred in parallel to shift register 60. The data bits in shift register 60 are serially shifted from higher to lower numbered bit positions of the register. In such registers, the entire contents of the register are transferred by simultaneous shifts to the next lower numbered bit position at the time of receiving clock synchronizing signal QKSC.

Temporary signal storage is provided in shift register 60 to permit a register flip-flop to change its state at the same time that its contents are being transmitted to another register flip-flop, i.e., during a serial shift of data in the register. This temporary signal storage is usually supplied by capacitors in the register and in the flip-flop logic input circuits. These capacitors store the logic signal levels from the output terminals of the data transmitting flip-flop prior to the occurrence of the clock signal that causes the data transmitting flip-flop to change its state and the corresponding data receiving flip-flop to receive the contents of the data transmitting flip-flop. When a clock signal is applied to the register, the contents of the data transmitting flip-flops are held in the capacitors sufficiently long for the data receiving flip-flop to respond thereto, while the data transmitting flip-flop may simultaneously have the state thereof changed. Similarly, where the contents of one flip-flop are transmitted to another through a logic gate, the flip-flop input capacitors provide temporary storage for the input logic signal levels. Since this type of shift register is well known in the art, detailed structure of shift register temporary storage circuitry has been omitted.

Clock Generator and Bit Counter

Figure 9:
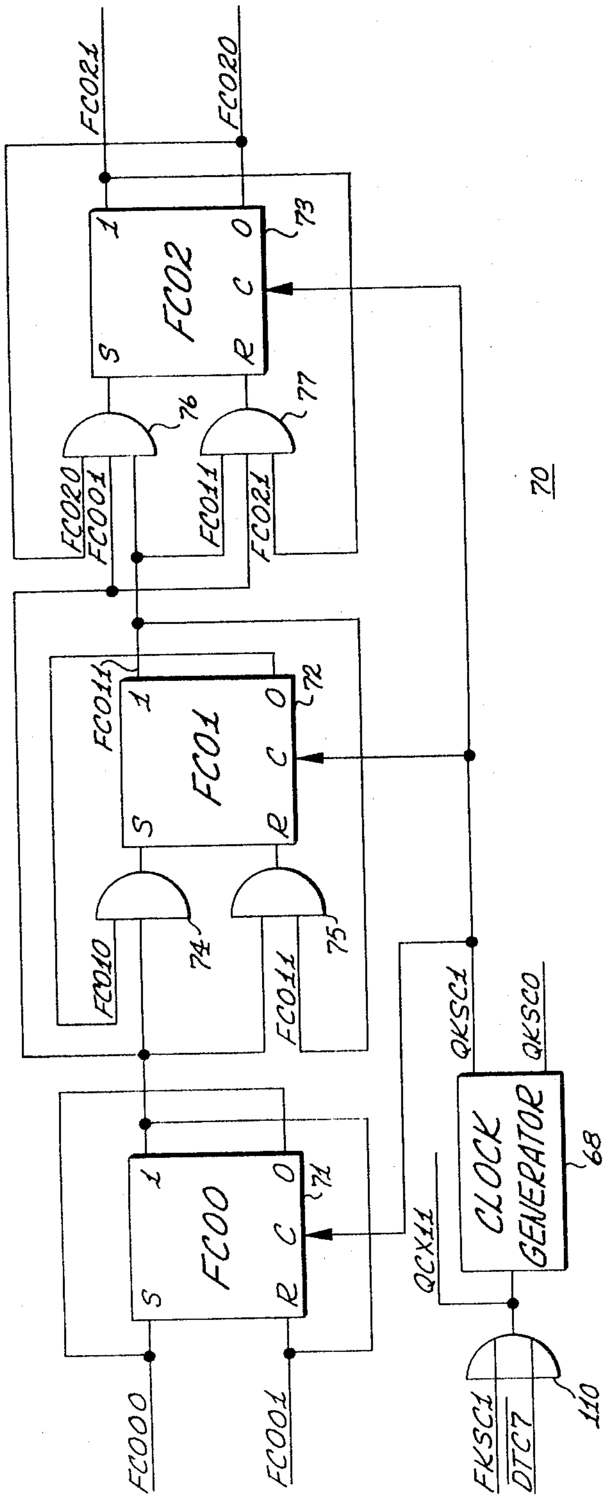
FIG. 9 is a schematic block diagram of the clock generator and bit counter logic shown in FIGS. 7 and 17.

The basic timing for the perforated tape subsystem control mechanism is supplied by a clock generator and binary (bit) counter circuits forming a part of the controller unit 26 shown in FIG. 1. The clock generator 68 shown in FIG. 9 is a symmetrical or free running multivibrator running at a frequency of approximately 2 million cycles per second, which is capable of being started and stopped by a logical control signal QCX11. The bit counter 70 is a standard binary counter circuit with counting enabled by the clock signals from the clock generator 68.

The bit counter 70 is a device for counting according to the binary system. A flip-flop may be used in a binary counter for counting a series of input signals such as pulses, by arranging for the flip-flop to be alternately set and reset at each input signal or pulse. Such a binary counter has only two different states. A plurality of N flip-flops may be cascaded, i.e., linked together, to form a binary counter having $2^N$ different states. AND-gates are used to link stages of the counter with the preceding stage to perform the function of applying a signal to that stage only when certain conditions exist.

FIGURE 9 illustrates a known binary counter employing three flip-flops, 71, 72 and 73 forming a three-stage counter. Each flip-flop has a set terminal S, a reset terminal R, a clocking terminal C, a 0-output terminal and a 1-output terminal. The set input terminal of flip-flop 71 is adapted to receive a count initiating input signal FC000.

In the counter embodiment shown in FIG. 9, the maximum number which can be loaded into the counter is eight. The counter receives a clock pulse signal QKSC1 and is incremented by one for each clock pulse received. The clock pulse signal is a regularly produced signal provided by the clock generator 68. The counter is reset to zero when it reaches a binary count of 111 or a decimal count of 7.

Assume that the flip-flops 71, 72 and 73 are initially all in their 0-states, a positive count initiating signal or pulse FC000, when applied to the set input terminal of flip-flop 71, will set it upon the sequential application of a clock pulse signal QKSC1 to its clock terminal C. After the setting of flip-flop 71, a positive signal FC001 from its 1-output terminal is applied to one of the input terminals of each of AND-gates 74 and 75 associated with flip-flop 72. This output signal is also applied to the reset terminal of flip-flop 71 for resetting flip-flop 71 upon the occurrence of a second clock pulse QKSC1. Since the 1-output terminal of flip-flop 71 is connected to its reset terminal R, each incoming clock pulse QKSC1 alternately sets and resets this flip-flop. The counter, reading from left to right in FIG. 9, now contains a binary count of 100 or a decimal count of 1.

The initial application of the input signal FC000 to flip-flop 71 enables AND-gate 74 and its output signal is applied as a setting signal to the setting input terminal of flip-flop 72. Flip-flop 72 is then set by the receipt of a second clock signal QKSC1 to its clocking terminal C. The same clocking signal resets flip-flop 71. Thus, the counter now indicates a reset condition of flip-flop 71 and a set condition of flip-flop 72 indicating a binary count of 010 or a decimal count of 2.

The setting of flip-flop 72 provides an output signal FC001 from its 1-output terminal which is applied to the other input terminal of AND-gate 75. Upon receipt of the third clock pulse QKSC1, flip-flop 71 is again set. Flip-flop 72 remains set. The setting of flip-flop 71 enables AND-gate 75. Flip-flops 71 and 72 are ready to be reset upon the receipt of the fourth clock pulse QKSC1. Binary counter 70 now indicates a binary count of 110 or a decimal count of 3. The setting of flip-flops 71 and 72 provides enabling signals FC001 and FC011 from their 1-output terminals to the input terminals of AND-gate 76. The fourth clock pulse then resets flip-flops 71 and 72 and sets flip-flop 73. The counter now contains a binary count of 001 or a decimal count of 4.

Upon the occurrence and application of the fifth clock pulse QKSC1 to counter 70, flip-flop 71 is set; flip-flop 72 remains reset and flip-flop 73 remains set. Flip-flop 73 remains set since AND-gate 77 is not enabled because it does not receive an enabling signal FC011 from the 1-output terminal of flip-flop 72. The binary counter now has a binary count of 101 or a decimal count of 5.

The sixth clock pulse applied to counter 70 resets flip-flop 71 and sets flip-flop 72. Flip-flop 73 remains set. Flip-flop 73 remains set since the enabling signal FC011 for AND-gate 77 is missing and flip-flop 73 cannot be reset. The binary count in counter 70 is now 011 or a decimal count of 6.

Upon the occurrence of the seventh clock pulse, flip-flops 71, 72 and 73 are set indicating a binary count of 111 or a decimal count of 7. An eighth clock pulse resets flip-flops 71, 72 and 73. Thus, upon the eighth clock pulse, the counter returns to a binary count of 000 or a decimal value of 0.

In the embodiment disclosed, timing control periods are generated by the counter. These control periods are identified herein as signals DTC0 to DTC7 wherein each signal represents the state of each flip-flop of the counter at a particular count. For example, DTC0 represents the 0-state of flip-flops 71, 72 and 73 when the counter is at a decimal count of zero.

DESCRIPTION OF READ TAPE MODE OF OPERATION

As mentioned heretofore, the data transmitted from tape reader 20 to the shift register 60 is transferred in parallel through reader column terminals 1 through 8 shown in FIG. 8. This transfer takes place when conjunction occurs in AND-gates **82*a* through 82*h* between the data input signals from columns 1 through 8 of the tape reader and the associated signal from the sprocket hole read by the tape during a reading of the data character being transmitted to the shift register. The sprocket holes synchronize timing for utilization of the data signals from the reading head and generate a signal PHSR each time a sprocket hole is read. This signal is utilized in AND-gates 82*a* through 82h to enable the transfer of data signals uniformly to the shift register. The output signal of AND-gates 82*a* through 82*h* enables OR-gates 83*a* through 83*h*, respectively, to set the flip-flops FKS0 through FKS7 if a binary 1 represented by a positive signal is applied to the reader columns 1 through 8, respectively. If a negative signal represented by a binary 0 is applied to any of reader columns 1 through 8, conjunction will not occur in the respective AND-gate 82** associated therewith and correspondingly the flip-flop representative of the reader column read will not be set.

Figure 11:
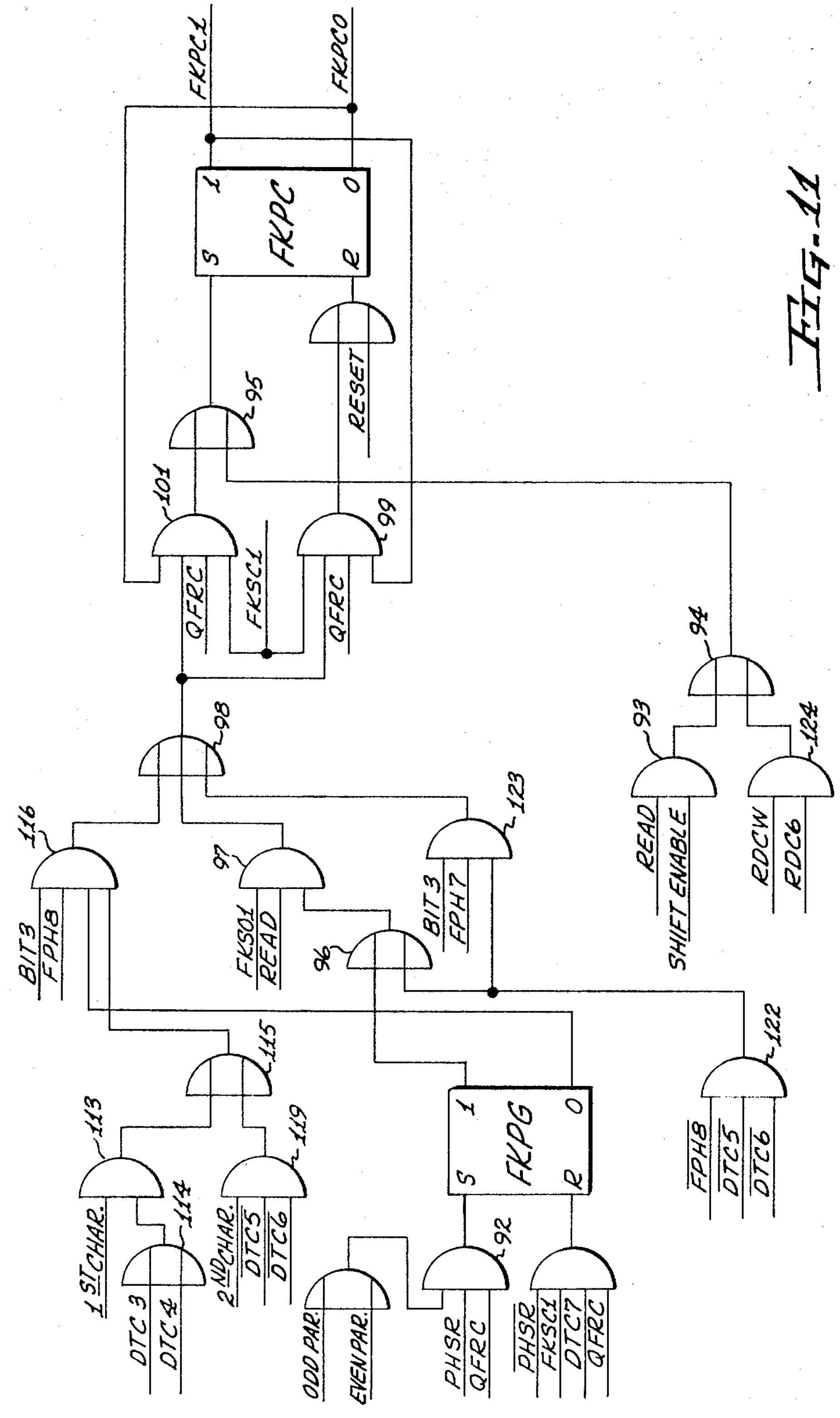
FIG. 11 is a schematic block diagram of the parity calculator logic shown in FIGS. 7 and 17.

During the presence of the sprocket pulse forming a part of the channel being read, the plugboard is examined to determine whether odd or even parity is to be checked. If either parity condition is to be checked, the parity flip-flop FKPG shown in the parity calculator logic of FIG. 11 is set and the parity sequence is followed.

Parity flip-flop FKPG is set because signals representing a parity check request from the plugboard, the sprocket enable pulse PHSR, and the main clock generator pulse QFRC are positive at this time and when applied to the input terminals of AND-gate 92, cause conjunction to occur therein resulting in an output signal which sets flip-flop FKPG.

During the presence of the sprocket pulse of the character read into shift register 60, various other functions of the plugboard 50 are also examined. One of these functions is whether one or two characters are to be generated for transfer to the memory of computer 22. If two characters are to be generated for the one character read by tape reader 20, the disclosed system must go through the double character sequence. If the plugboard is not set for the double character sequence, one data character is arranged in shift register 60 for a single transfer to computer 22.

Parity Checking

If at the termination of the sprocket pulse of the character read, parity flip-flop FKPG shown in FIG. 11 is set, the shift register 60 is shifted eight times, sampling parity from flip-flop FKS0 for all eight shift operations.

Data in shift register 60 is serially shifted from left to right as shown in FIG. 8 except the bit in flip-flop FKS0 which is shifted if a 1 bit through a logic circuit comprising AND-gate *64h* and OR-gate *83h* to the set terminal of flip-flop FKS7. Since the other input signals to AND-gate *64h* comprise a clocking pulse QKSC and the shift control signal FKSC1 (both of which are positive at this time), signals stored in flip-flops FKS0–FKS7 are shifted from left to right as in a ring type shift register.

Figure 10:
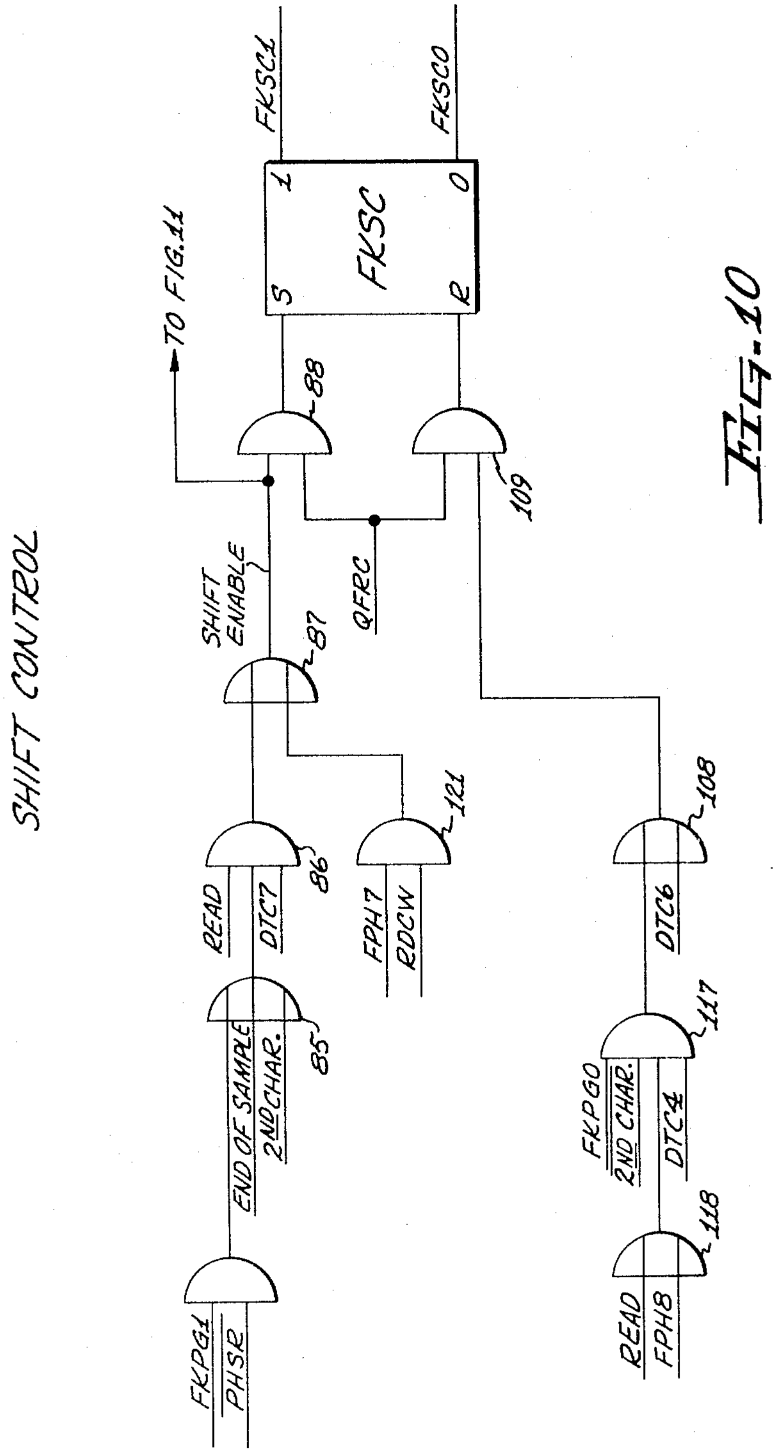
FIG. 10 is a schematic block diagram of the shift con-

The shift control signal FKSC1 is derived from an End of Sample signal which is applied to OR-gate 85 of the logic shown in FIG. 10. This signal is generated by the ending of the sprocket signal of the character read and transferred into the shift register. The resulting output signal of OR-gate 85 is applied as one of the three input signals to AND-gate 86. The other two input signals are positive at this time since the Read signal is high during the Read command of the computer program and the DTC7 signal of the bit counter 70 is high since the counter is in its inactivate state where each flip-flop is set representing a binary count of 111 or a decimal count of 7. Since conjunction occurs in AND-gate 86 at this time, an output signal is generated and applied to OR-gate 87. An output Shift Enable signal from OR-gate 87 is applied to one of the two input terminals of AND-gate 88. The other input terminal of AND-gate 88 has a clocking signal QFRC applied to it from a master clock generator (not shown) which enables AND-gate 88 and sets flip-flop FKSC. Signal FKSC1 from the 1-output terminal of flip-flop FKSC starts the clock generator 68 and counter 70 as well as enables the shift register 60. If the input signal FKS01 to AND-gate *64h* is positive at this time, conjunction in AND-gate *64h* occurs resulting in the setting of flip-flop FKS7 upon the occurrence of the next clock pulse QKSC.

If flip-flop FKS0 was in its reset state, conjunction would occur in AND-gate *65h*, resulting in a positive output signal being applied to OR-gate *66h* and the resetting of flip-flop FKS7.

Thus, the character transmitted to shift register 60 by the tape reader is continuously recirculated and shifted through the register as long as clock pulses are applied to the flip-flops. Shifting of the bits through register 60 occurs during each of the eight counts of the bit counter 70 resulting in the character read by the tape reader being shifted once through the shift register for each cycle of the bit counter.

At the start of each Read cycle, the parity calculator flip-flop FKPC shown in FIG. 11 is set as well as the shift control flip-flop FKSC as heretofore explained. Flip-flop FKPC is set by conjunction in AND-gate 93 of the Read command signal from the computer program and the Shift Enable signal from OR-gate 87 of FIG. 10. The output signal from AND-gate 93 is transmitted through OR-gates 94 and 95 to set parity calculator flip-flop FKPC.

As the bits are shifted around register 60, parity calculator or comparison flip-flop FKPC is complemented by each 1 bit in the binary character read into shift register 60. This occurs through the logic shown in FIG. 11 wherein the 1-output signal of the tape parity flip-flop FKPG is transmitted through OR-gate 96 to one of the input terminals of AND-gate 97. When a 1 bit is sensed in the flip-flop FKS0 of shift register 60 during a Read command of the program of computer 22 and the tape parity flip-flop FKPG is set, conjunction occurs in AND-gate 97 and an output signal therefrom is transmitted through OR-gate 98 to input terminals of AND-gate 99 and AND-gate 101. Two other input signals to AND-gates 99 and 101, namely signals FKSC1 and the master clocking signal QFRC, are positive. Conjunction will occur in either AND-gates 99 or 101 depending on the status condition of flip-flop FKPC. If flip-flop FKPC is set, then conjunction will occur in AND-gate 99. If flip-flop FKPC is reset, then conjunction will occur in AND-gate 101. Thus, the comparison means or bistable flip-flop FKPC will be complemented each time flip-flop FKS0 is set during the shifting of the character through the shift register.

Figure 12:
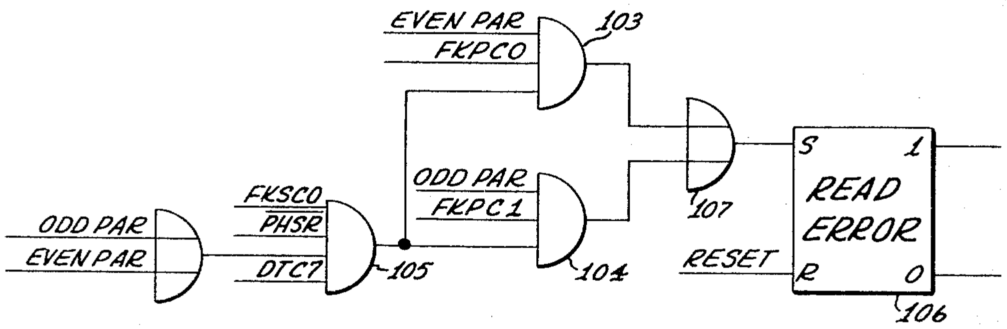
FIG. 12 is a schematic block diagram of the error control logic embodied in FIG. 1.

FIGURE 12 illustrates the logic for the error circuitry associated with shift register 60. If the plugboard 50 is wired for checking even parity, then a positive signal is applied to one of the input terminals of AND-gate 103. If odd parity is wired into plugboard 50, a positive signal is applied to one of the input terminals of AND-gate 104. The second input terminals of AND-gates 103 and 104, respectively, have signals FKPC1 and FKPC0 applied to them, the polarity of which is determined by the status of the parity calculator flip-flop FKPC. The third input signal of AND-gates 103 and 104 is obtained from the output of AND-gate 105. Conjunction in AND-gate 105 occurs when its input signals are all positive, namely the reset output signal FKSC0 of shift control flip-flop FKSC, a signal $\overline{\text{PHSR}}$ representing the absence of the sprocket pulse for the data character read, the parity signal FKPG1 from flip-flop FKPG representing that a parity check is requested, and the DTC7 signal indicating that the count of 7 is in the bit counter 70. The absence of a signal is represented herein by a bar over the signal identification. For example, $\overline{\text{PHSR}}$ represents the absence of the signal PHSR. The output signal from AND-gate 105 enables either AND-gate 103 or AND-gate 104 depending on the type of parity being checked as identified by the plugboard wiring. The output of either gate is transmitted to the set input terminal of read error flip-flop 106 through OR-gate 107.

Thus, if even parity is being checked during the transfer of the character bits through shift register 60 (assuming that parity calculator flip-flop FKPC is preset), parity calculator flip-flop FKPC will be reset for a character having only a 1 bit and set for a character having two 1 bits, etc. If flip-flop FKPC is not set after a predetermined shift operation when checking for even parity, an error condition exists. For odd parity, if the flip-flop is set, an error condition exists. If the error flip-flop is set, an error signal is generated which indicates this condition and terminates the parity generation and transfer of the shift register contents to the memory of computer 22.

Single Character Read Operation

Figure 13:
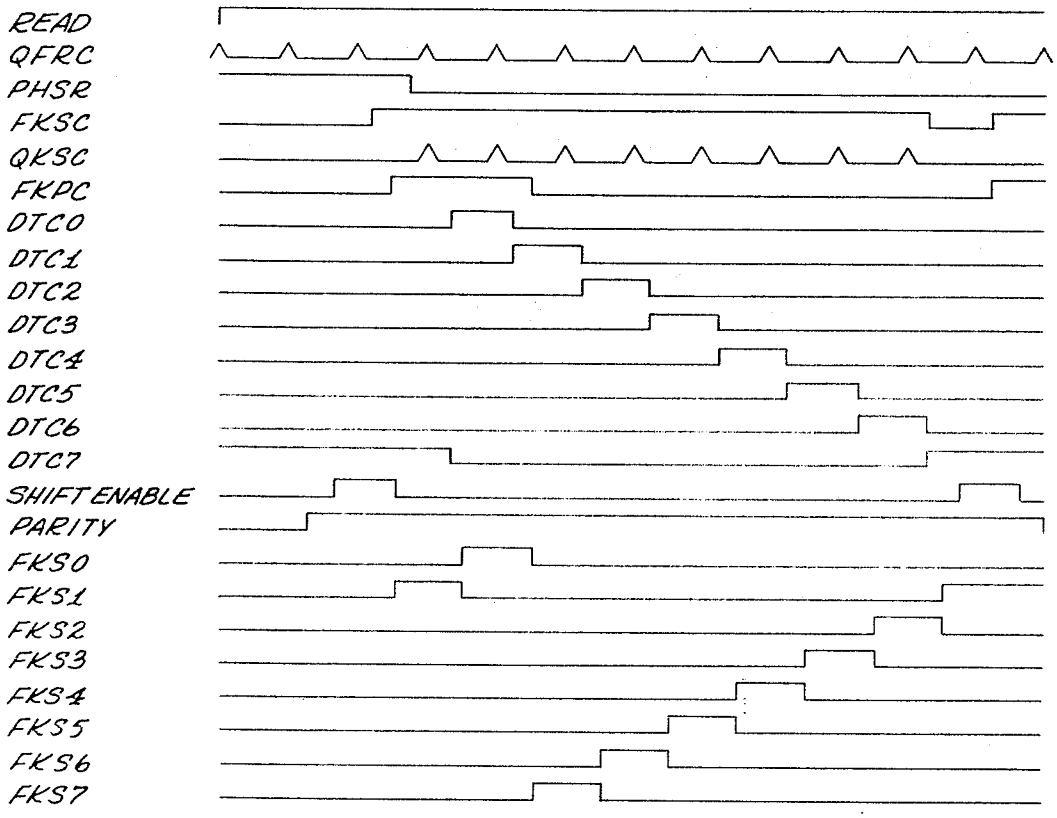
FIG. 13 is a diagrammatic illustration in chart form of the timing and logic signals involved in a parity checking Read operation.

The timing chart shown in FIG. 13 illustrates the movement of a character having a single 1 bit through the flip-flop of shift register 60. Reference is made to the curves relating to flip-flops FKS0 through FKS7 in time relation to the curve QKSC showing the output signals of the clock generator 68. In the curves illustrating the movement of a bit through the shift register, only a single bit is shown and this bit is illustrated as being in flip-flop FKS1 when the bits of the data character read are transferred from the tape reader 20 into the shift register. It should be noted that the parity calculator flip-flop FKPC is reset at the time the 1 bit is moved out of flip-flop FKS0.

When the bit counter 70 reaches the decimal count of 6, a positive DTC6 signal is generated and applied to an input terminal of OR-gate 108 of FIG. 10. The output signal from OR-gate 108 is applied to AND-gate 109. Upon the existence of a master clock pulse at the other input terminal of AND-gate 109, conjunction occurs in AND-gate 109 causing an output signal which resets flip-flop FKSC.

If a data character is read by tape reader 20 and no parity check is required by the plugboard, the character will be read as previously described and one of the transfer operations to the computer will be initiated without parity checking being performed.

Single Character Transfer Operation

At this point with the data character in the shift register, one of two possible sequences may be entered into. One sequence is the transfer of a single character to memory of computer 22 and the other sequence is the transfer of a double character to memory of computer 22. If the first sequence is required by the plugboard, a single character will be transferred to the computer. A parity calculation will be generated for this single character. In this instance, the data is shifted only six times with parity being calculated for each of the six shift operations. It should be noted that, even though the data is read directly from the tape into flip-flops FKS0 to FKS7, the data is transferred to the memory of the computer from flip-flops FKS2–FKS7 of the shift register. This results in a minimum shift operation for both the single and double character parity calculations.

From the timing chart shown in FIG. 13 representing the transfer of a character having a single 1 bit in flip-flop FKS1, it is noted that the parity calculator is reset when the 1 bit of the character reaches flip-flop FKS0 of the shift register.

Figure 14:
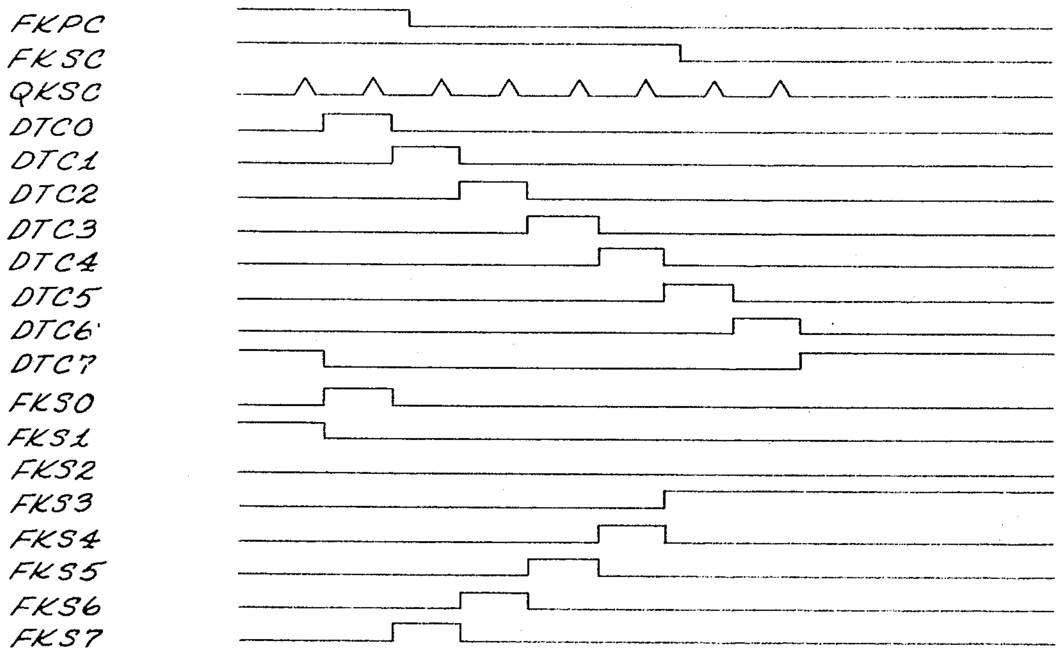
FIG. 14 is a diagrammatic illustration in chart form of the timing and logic signals involved in a Read operation for a single character transfer of information out of the shift register.

In order to arrange a single character in the proper position in the shift register for transfer to computer 22 and to calculate parity for this character before transfer, the bits of the character must be shifted from their original positions in the shift register to flip-flops FKS2 through FKS7. In other words, the bits of the character to be transferred to computer 22 must be sifted past flip-flop FKS0 to generate a parity bit and six positions therebeyond to position the character properly for transfer to the memory of computer 22. This is accomplished by resetting the shift control flip-flop FKSC during the count of 4 of the bit counter 70 so that no shifting of the data bits is done during the remainder of the time that the bit counter is counting to a decimal value of 7. Thus, if a six bit character is transmitted to flip-flops FKS0 through FKS5 of the shift register from the tape reader, the register is shifted eight times to check the parity of the character read. Then the character is shifted six positions more to position it for transfer to the memory of computer 22. During the six position shift operation, parity is generated for the six bit character to be transmitted to the memory of computer 22. This generated parity is obtained in the same general way using similar logic as parity is checked for the character read off tape using the parity calculator flip-flop FKPC. Reference is made to FIG. 14 for an illustration of the timing sequence of the signals involved in the single character transfer operation.

The shifting of the data bits through the shift register is controlled by the shift control flip-flop FKSC. As shown in FIG. 10, this flip-flop is reset at a decimal count of 6 of the bit counter 70 by the application of signal DTC6 to OR-gate 108. The output signal from OR-gate 108 is applied as an ouput signal to AND-gate 109. Upon the receipt of a master clock signal QFRC to the other input terminal of AND-gate 109, conjunction occurs in AND-gate 109 resulting in the resetting of the shift control flip-flop FKSC. The resetting of flip-flop FKSC stops the shifting of the character bits through shift register 60, but does not stop the bit counter 70. Bit counter 70 continues shifting until it has reached the decimal count of 7.

At the end of the transfer of the bits of the character six positions, the data is in the correct position to be transferred to the memory of the computer. The parity calculator flip-flop FKPC contains the parity bit for transfer to memory and the flip-flops may then be returned to their normal state for the next character checking and transfer operations.

Double Character Transfer Operation

The double character shift sequence is entered into whenever the plugboard is wired for such a mode of operation. The initial sequence for checking the parity of the eight bit character received by the shift register is the same as for the single six bit character heretofore explained. In the double character mode, however, the bits in flip-flops FKS6 and FKS7 are shifted with their generated parity bit to the memory of the computer first and then the remaining six bits of the character with their parity bit are transferred to memory.

In order to accomplish this function with a minimum number of shift operations, the shifting sequence is initiated, as heretofore explained, with the parity calculator flip-flop FKPC enabled. However, during the first four shift steps, no parity sampling is done. Only during the time that the bits in shift register flip-flops FKS7 and FKS6 pass flip-flop FKS3 is parity sampled and calculated. This occurs during timing counts 3 and 4 of the bit counter 70.

As noted from the parity calculator logic shown in FIG. 11, conjunction occurs in AND-gate 113 during counts 3 and 4 of the bit counter 70 since during this time a positive signal is transmitted to one of the input terminals of AND-gate 113 from OR-gate 114. The other input terminal to AND-gate 113 is positive at this time because the signal applied thereto indicates that the first character of a double character is being readied for transmittal to the computer. The output signal from AND-gate 113 is transmitted through OR-gate 115 to an input terminal of AND-gate 116. The signal from the 0-output terminal of tape parity flip-flop FKPG and the signal from the plugboard indicating that the system is in a double character mode are applied to two other input signals to terminals of AND-gate 116. The fourth input terminal to AND-gate 116 indicates the polarity of the bit in flip-flop FKS3 of the shift register. If the bit in FKS3 is a 1 bit, the parity calculator flip-flop FKPC is complemented as heretofore explained. Only during time counts 3 and 4 is the parity calculator flip-flop FKPC capable of being complemented. At other times during this sequence of operation, it is inactivated since AND-gate 113 is not enabled except during counts 3 and 4.

The shift register is shifted only six times since the shift control flip-flop FKSC is reset at the end of six counts of the bit counter, as heretofore explained, thereby disabling AND-gate *64a–64h* of FIG. 8. The resetting of flip-flop FKSC occurs at count 4 since all of the signals to the input terminals of AND-gate 117 are positive at this time. As shown in FIG. 10, the input signal to the top input terminal of AND-gate 117 is from the 0-output terminal of the tape parity flip-flop FKPG which is positive at this time. The signal to the second input terminal is from a flip-flop (not shown) indicating that the second character of a double character is not being transferred to computer 22, and the signal to the third input terminal is positive since it is the output signal of OR-gate 118 which is enabled by the Read command of the computer program being executed. The output signal of AND-gate 117 is transmitted through OR-gate 108 to an input terminal of AND-gate 109 wherein conjunction occurs at the next clock pulse QFRC to reset flip-flop FKSC thereby disabling the shift register 60.

This action results in the data being positioned with the data bits originally transferred from tape reader to flip-flops FKS7 and FKS6 in flip-flops FKS0 and FKS1 of the shift register. The other bits of the data character are in positions similarly corresponding to their original positions.

Figure 15:
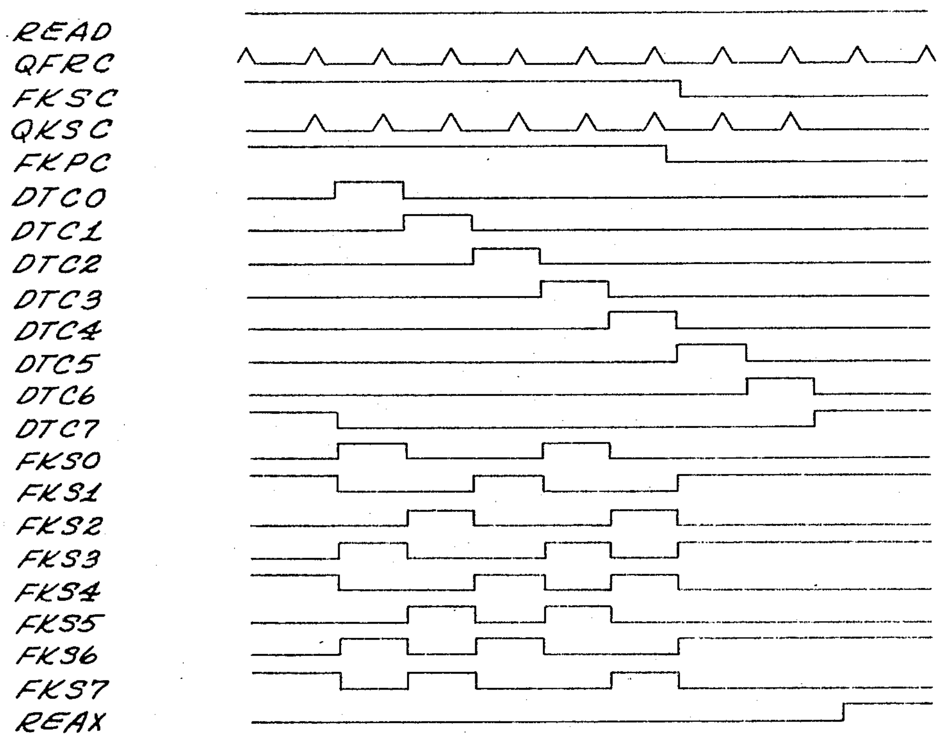
FIG. 15 is a diagrammatic illustration in chart form of the timing and logic signals involved in a Read operation, double character mode, first character transfer of information out of the shift register.

In the timing chart shown in FIG. 15, various signals are illustrated showing the condition of the flip-flops and other signal conditions for the transfer to memory of the first character of a double character sequence. This figure illustrates a data character received from the tape reader having a 1 bit in the flip-flops FKS7, FKS4 and FKS1.

The entire tape character is maintained in the register during the transmittal of the first character to the computer.

Upon the receipt of a signal from the computer that the first character has been received, the parity calculator and shift control flip-flops are again set. The setting of these flip-flops occurs, as heretofore explained, by first setting the shift control flip-flop FKSC. Flip-flop FKSC is set by conjunction occurring in AND-gate 86 of FIG. 10 resulting in the setting of flip-flop FKSC. The setting of flip-flop FKSC sets flip-flop FKPC as a result of conjunction occurring in AND-gate 93 of FIG. 11.

Upon the setting of flip-flops FKSC and FKPC, the shift register is ready for generating a parity bit for the second character and for arranging the bits of the second character in position for transfer to the memory of computer 22. The shift register is then shifted eight times with parity being sampled from flip-flop FKS2 during its first six shift operations. This results in parity being calculated on the bits presently in flip-flops FKS2 through FKS7 of shift register 60.

Figure 16:
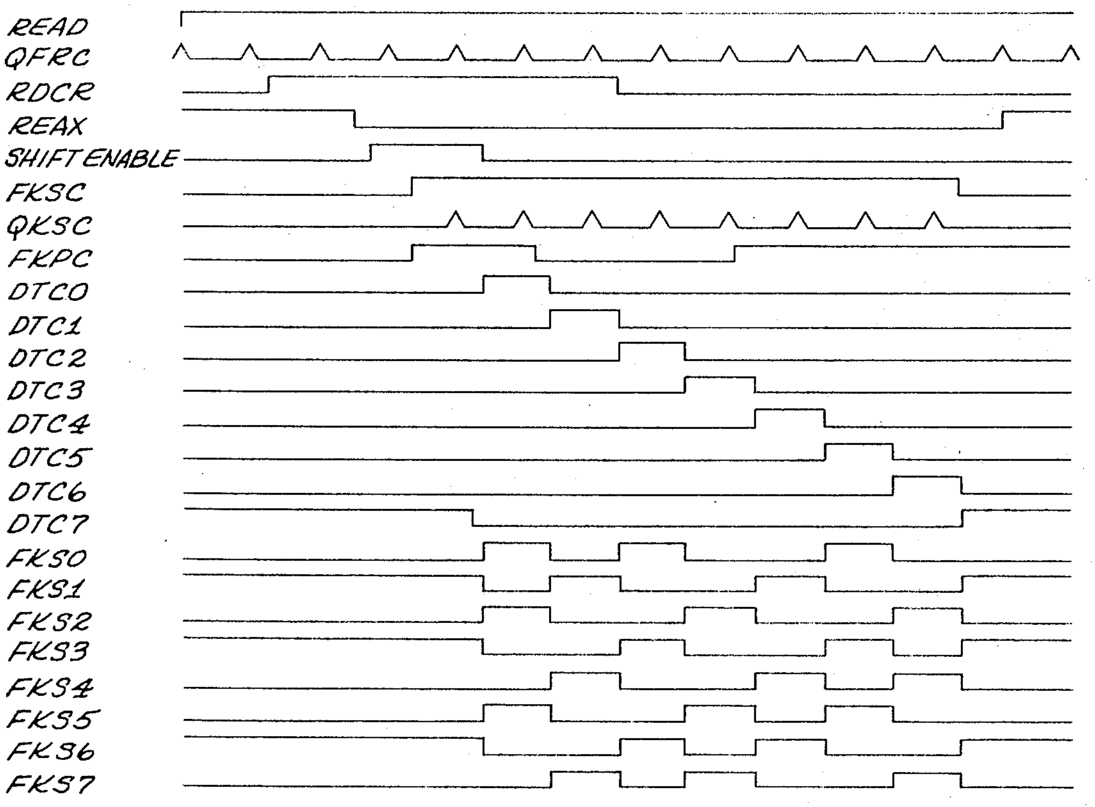
FIG. 16 is a diagrammatic illustration in chart form of the timing and logic signals involved in a Read operation, double character mode, second character transfer of information out of the shift register.

FIGURE 16 illustrates a timing chart similar to that shown in FIG. 15 but directed to the signals related to the transfer and parity generation for the second character. In the shifting of the six bits forming the second character of the data received from the tape reader, the 1 bits originally positioned in flip-flops FKS1 and FKS4 each complements the parity calculator flip-flop FKPC resulting in flip-flop FKPC being set indicating an even parity for the six bit character. This six bit second character is now in flip-flops FKS7 through FKS2 and signals representing this character are ready for transfer to the memory of computer 22 together with the signal representing the parity bit generated by flip-flop FKPC. It should be noted from FIG. 11 that during counts 5 and 6 of the bit counter 70, conjunction does not occur in AND-gate 119 and consequently the parity calculator flip-flop FKPC is not complemented for bits 7 and 8 of the information during the processing of the second character of the data.

DESCRIPTION OF PUNCH TAPE MODE OF OPERATION

Figure 17:
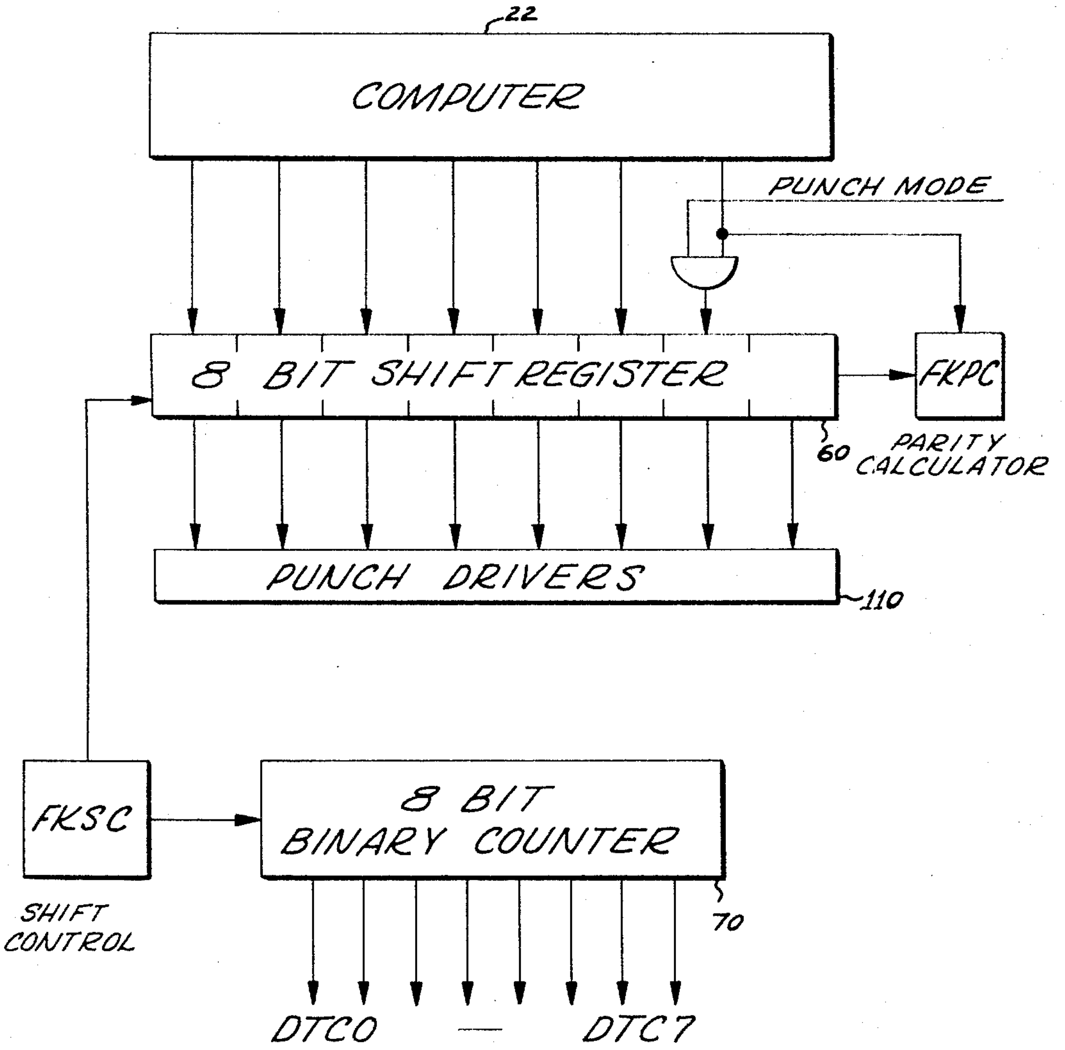
FIG. 17 is an expanded partial view of the block diagram shown in FIG. 1 illustrating data flow from the computer to the punch drivers of the tape punch.

The punch tape operation of the subsystem illustrated in more detail in FIG. 17 is similar to the read tape operation of the subsystem as shown in FIG. 7. The shift control and parity calculator flip-flops FKSC and FKPC, respectively, are enabled in the same general manner as explained for the Read operation.

When the subsystem receives a command from the computer program to punch tape, terminal 21 is activated causing tape to be fed from the reel in housing 42 through the punch head structure 40 to the take-up reel 48. Data is transferred from the memory of computer 22 to the shift register 60 in bit parallel form, passing through the data receive logic of block 100 shown in FIG. 1. From the shift register 60, the data bits are transferred through the data control logic in block 80 to the punch drivers in block 110. The punch drivers synchronously with timing pulses engage selected punch pins of the punch head structure 40 to perforate the tape, the hole pattern being representative of the character transfer to terminal 21 from computer 22.

A number of program commands are recognized by the subsystem for punching tape. One command causes the punching of a single character representing the six bits transmitted to the subsystem from the memory of computer 22. A second command causes the punching of the six bits received from memory together with a parity bit. A further command called punched double character causes the punching of a single tape character formed from two computer stored characters. The two computer stored characters may comprise the double characters sent to memory during the subsystem's read tape double character mode of operation. The transfer of data to the punch terminal is done in response to a Write request from the perforated tape subsystem.

Single Character Punch Operation

In response to a Write request from the perforated tape subsystem for the transfer of a single character from the memory of computer 22 to the tape punch, signals representing a six bit character are transferred one to each of the input terminals of AND-gates 120*c* through 120*h*. These AND-gates are enabled upon receipt of a Write response receiver signal RDCW from the subsystem and the character is transferred into flip-flops FKS7 through FKS2 of shift register 60 shown in FIG. 8. As noted, bit one of computer stored character is stored in flip-flop FKS7, bit two in flip-flop FKS6, etc. This reversal of the bits of the character in relationship to their arrangement in the shift register when transferred thereto from the tape reader is necessary in order to utilize the shift logic for both the Read and Punch operations.

The command requesting the punching of a single character generates a Punch mode signal which, together with the signal RDCW generated by the computer, transfers through AND-gates 120*c*–120*h*, the six bit memory character to shift register 60. These signals are also applied to input terminals of AND-gate 121 of FIG. 10 causing conjunction therein resulting in an output signal which is transferred through OR-gate 87 to one of the input terminals of AND-gate 88. The master clocking signals QFRC are applied to the other input terminal of AND-gate 88, as heretofore explained, causing conjunction therein resulting in the setting of the shift control flip-flop FKSC. The setting of this flip-flop starts the clock generator 68.

If it is desired to check parity transmitted from the computer to the shift register in the same manner as parity was generated during the Read operation, the parity calculator flip-flop FKPC will be set at the same time that the shift control flip-flop FKSC is set. Shifting and toggling of flip-flop FKPC will occur as heretofore described during the parity checking operation and the result will be stored in flip-flop FKPC. The contents of flip-flop FKPC is then checked against transmitted parity from the computer as represented by signal RDC6. In this embodiment, a different method of checking parity is disclosed. Parity represented by the signal RDC6 transmitted from computer 22 is stored in flip-flop FKPC at the same time as the data is stored in the shift register 60. Then the results of the parity checking operation are checked against the original conditions of flip-flop FKPC.

Shift register 60 is shifted through all eight cycles with parity being calculated during the first six cycles from flip-flop FKS2 as explained for the Read mode of operation. Since this is a Punch operation for a single character, conjunction occurs at the start of a Punch operation in AND-gate 122 of FIG. 11. Counts 5 and 6 have not occurred in bit counter 70 so all of the input signals to the input terminals of AND-gate 122 are positive. The output signal of AND-gate 122 is applied as one of the input terminals to AND-gate 123. The other input terminals to AND-gate 123 are positive when a 1 bit is positioned in flip-flop FKS2 of the shift register 60. Therefore, each time a 1 bit of the data character being punched passes through flip-flop FKS2, the parity calculator flip-flop FKPC is complemented. This results in flip-flop FKPC always being in its 1-state after a shifting operation if the data from the computer has been received correctly. It is, of course, recognized that if even parity is transmitted to the shift register, parity calculator flip-flop FKPC would be reset after a shifting operation if the data from the computer has been received correctly. By shifting the register eight times, the data character is correctly positioned for a punching operation with bit one being in flip-flop FKS7 and bit six being in flip-flop FKS2 of the shift register 60.

In order to utilize the single character with parity command of the computer, separate decode logic arranged between the shift register and the punch head structure is needed in order to punch the parity bit. In the process of punching the six bit data character with parity, the parity bit is transferred from the memory of the computer to flip-flop FKS1 from which it is transferred with the bits in the other flip-flops of the shift register during a shifting operation. Parity, as explained, is checked for only the bits in flop-flops FKS2 through FKS7.

Figure 18:
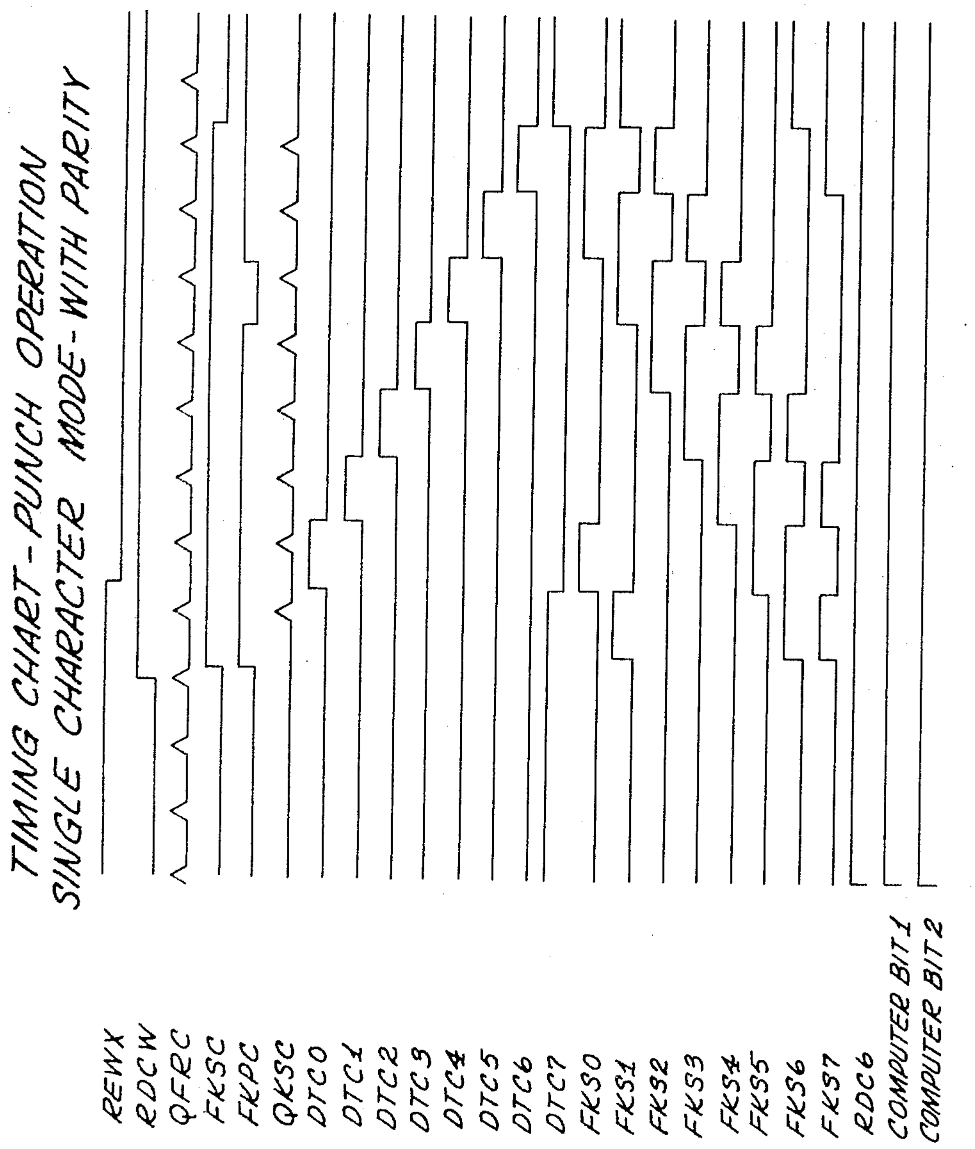
FIG. 18 is a diagrammatic illustration in chart form of the timing and logic signals involved in a Punch operation, single character mode with parity transfer of information to the tape punch.

In the timing chart shown in FIG. 18, bits 1 and 2 of a memory character, together with their odd parity bit, are illustrated in their various positions during a shifting and parity checking operation. Once the character has been punched, the shitf register is cleared by a reseting operation and a new Write request may be instigated.

Double Character Punch Operation

As in the single character punch mode of operation, the command initiating the double character punch mode enables AND-gates 120*c* through 120*h* and the data character is transferred into flip-flops FKS2 through FKS7. However, in the double character mode of operation, it is necessary to transfer the data bits of the first character into flip-flops FKS1 and FKS0. In order to do this, the register is shifted only six times with parity being calculated during all six shift operations. At the end of the sixth shift operation, the parity calculator flip-flop should be in its set state. If not, an error flip-flop (not shown) will be set.

After the bit counter 70 has returned to its reset state and the computer alerted that the first character has been received, the second character of the double character arrangement is transferred through AND-gates 120*c* through 120*h* to shift register 60. Upon receipt of a second Write signal from the computer, AND-gate 121 in FIG. 10 is enabled again to set shift control flip-flop FKSC. The same general logic as described for shifting the first character through the register shifts the second character through the register eight times. The parity calculator flip-flop FKPC is complemented during the first six shift cycles, the same as for the single character punch mode. This results in parity being calculated on the second six bit character without disturbing the first two bit character.

It should be noted that at this time the shift register contains in flip-flops FKS0 and FKS1 the two data bits comprising the first character while flip-flops FKS2 through FKS7 contain the six data bits of the second charter.

At the end of the eight shift cycles of the shift register, the data will be correctly positioned in flip-flops FKS0 through FKS7 and the punching operation, including the transfer of data to the punch drivers, may be initiated. After the entire character has been punched, the cycle may be repeated.

Figure 19:
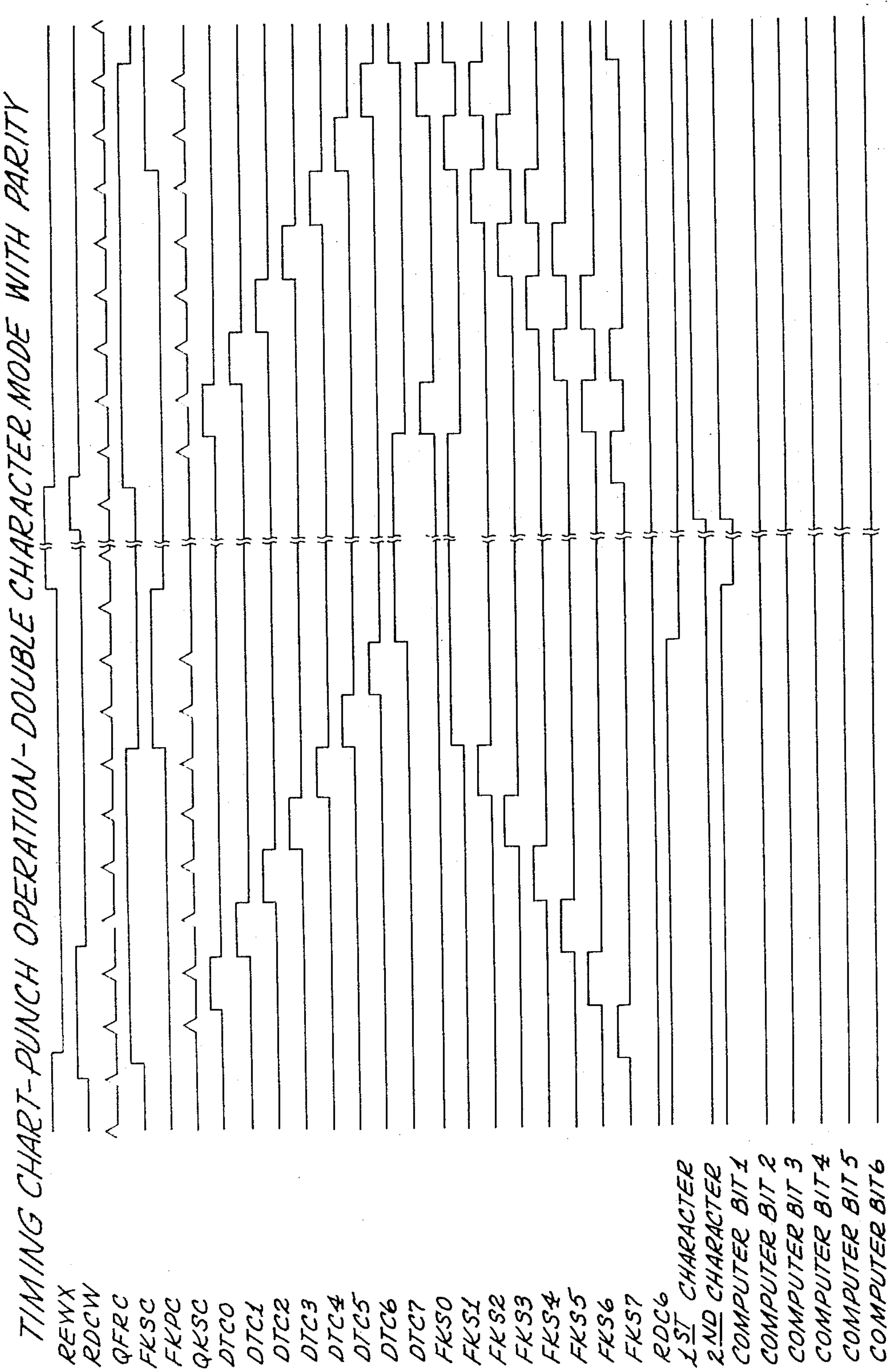
FIG. 19 is a diagrammatic illustration in chart form of the timing and logic signals involved in a Punch operation, double character mode with parity transfer of information to the tape punch.

FIGURE 19 is a timing chart illustrating the bit transfer through the shift register of two 1-bit characters during a double character punch mode of operation.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particular adapted for specific environments and operating requirements without departing from those principles. The appended claims are therefore intended to cover and embrace any such modifications, within the limits only of the true spirit and scope of the invention.

What is claimed is:

1. Data manipulating apparatus comprising a multiple channel transfer circuit adapted to transfer a plurality of signals representing binary digits, said transfer circuit comprising a shift register arranged to received said signals and means for shifting said signals in said shift register prior to transfer, and comparison means connected to one stage of said shift register and actuated by each signal representative of a given binary digit passing said stage during a shift operation, said comparison means producing an error signal during said shift operation if a lack of identity of the signals shifted in said shift register with a given initial condition of said comparison means occurs.

2. Data manipulating apparatus comprising a multiple channel transfer circuit adapted to transfer a plurality of signals representing binary digits, said transfer circuit comprising a shift register arranged to receive said signals and means for shifting said signals in said shift register prior to transfer, and comparison means connected to at least one stage of said shift register and actuated by each signal representative of a given binary digit passing said stage during shift operations, said comparison means producing an error signal during a first shift operation if a lack of identity of the signals shifted in said shift register with a given initial condition of said comparison means occurs.

3. Data manipulating apparatus comprising a multiple channel transfer circuit adapted to transfer a plurality of signals representing binary digits, said transfer circuit comprising a shift register arranged to receive said signals and means for shifting said signals in said shift register prior to transfer, and comparison means connected to at least one stage of said shift register and actuated by each signal representative of a given binary digit passing said stage during shift operations, means responsive to a condition of said comparison means during a first shift operation for producing a first signal, and means responsive to the absence of said first signal for producing a subsequent signal during a subsequent shift operation representative of the condition of said comparison means during said subsequent shift operation.

4. Data manipulating apparatus comprising a multiple channel transfer circuit adapted to transfer a plurality of signals representing binary digits, said transfer circuit comprising a circulating shift register arranged to receive said signals and means for shifting said signals in said shift register prior to transfer, comparison means connected to at least one stage of said shift register and actuated by each signal representative of a given binary digit passing said stage during shift operations, means responsive to a first condition of said comparison means for producing a first signal during a first shift operation indicative of a lack of identity of the signals shifted in said shift register with said first condition of said comparison means, and means responsive to a second condition of said comparison means for producing a second signal during a second shift operation representative of at least a part of the signals shifted in said shift register during said second shift operation.

5. Data manipulating apparatus comprising a multiple channel transfer circuit adapted to transfer a plurality of signals representing binary digits, said transfer circuit comprising a shift register arranged to receive said signals and means for shifting said signals through said shift register in a predetermined manner prior to transfer, comparison means connected to at least one stage of said shift register and changed by each signal representative of a given binary digit passing said stage during shift operations, means for producing an error signal during a first shift operation indicative of a lack of identity of the signals shifted in said shift register with a given condition of said comparison means, and means for producing a parity signal during a second shift operation indicative of the condition of said comparison means during said second shift operation.

6. The combination as claimed in claim 5 in which said shift register is a circulating shift register.

7. The combination as claim in claim 5 in which said comparison means comprises a bistable device.

8. The combination as claimed in claim 5 in which said comparison means comprises a bistable flip-flop.

9. Data manipulating apparatus comprising a multiple channel transfer circuit adapted to transfer a plurality of signals representing binary digits, said transfer circuit comprising a circulating shift register arranged to receive said signals and timing means for controlling the shifting of each signal through said shift register, comparison means connected to at least one stage of said shift register and actuated by each signal representative of a given binary digit passing said stage during shift operations, an error sensing circuit for producing an error signal, first means for connecting said comparison means to said error circuit, said first means activating said error circuit during a first shift operation if said comparison means is in a first state at a given time in said timing cycle, and second means for producing a parity signal during a second shift operation indicative of the condition of said comparison means at another given time.

10. The combination as claimed in claim 9 in which said comparison means comprises a bistable device.

11. The combination as claimed in claim 9 in which said comparison means comprises a bistable flip-flop.

12. Data manipulating apparatus comprising a multiple channel transfer circuit adapted to transfer a plurality of signals representing binary digits, said transfer circuit comprising a circulating shift register arranged to receive said signals and timing means for controlling the shifting of each signal through said shift register, comparison means connected to at least one stage of said shift register and actuated by each signal representative of a given binary digit passing said stage during shift operations, means for sequentially arranging said signals in different arrays in said shift register, and means for producing a parity signal for each array of signals formed during the shift operations indicative of the condition of said comparison means at a given time during that shift operation.

13. The combination as claimed in claim 12 in which said comparison means comprises a bistable device.

14. The combination as claimed in claim 13 wherein said comparison means is complemented by each signal representative of a like binary digit passing said stage.

15. The combination as claimed in claim 12 in which said timing means comprises a binary counter.

16. Data manipulating apparatus comprising a multiple channel transfer circuit adapted to transfer a plurality of signals representing binary digits, said transfer circuit comprising a circulating shift register arranged to receive said signals and timing means for controlling the shifting of each signal through said shift register, comparison means connected to at least one stage of said shift register and changed by each signal representative of a given binary digit passing said stage during shift operations, an error sensing circuit for producing an error signal, first means for connecting said comparison means to said error circuit, said first means activating said error circuit during a first shift operation if said comparison means is in a first state at a given time of a timing cycle of said timing means, second means for sequentially arranging said signals in different arrays in said shift register at a given time in said timing cycle, and third means for producing a parity signal during the positioning of each array indicative of the condition of said comparison means at a given time in said timing cycle during each shift operation.

17. The combination as claimed in claim 16 in which said comparison means comprises a bistable device.

18. The combination as claimed in claim 16 in which said timing means comprises a binary counter.

19. A system for minimizing errors in binary information transmitted in bit form from a digital signal source to a ultilization means comprising a transfer circuit having an input terminal and an output terminal, a utilization means, means connecting the input terminal of said transfer circuit to said source and the output terminal of said transfer circuit to said utilization means, said transfer circuit comprising a shift register arranged to receive signals from said source and means for shifting said signals through said shift register in a predetermined manner prior to transferring them to said utilization means, and comparison means connected to said shift register for producing a first output signal during a first shift operation of said shift register indicative of a lack of identity of the input signals to said transfer circuit with a given condition of said comparison means and a second output signal during a second shift operation of said shift register indicative of the parity of the output of said transfer circuit.

References Cited

UNITED STATES PATENTS

| | | | |
|---|---|---|---|
| 2,702,380 | 2/1955 | Brustman et al. | 178—26.5 X |
| 3,000,556 | 9/1961 | Bewley et al. | 235—154 X |
| 3,024,444 | 3/1962 | Barry et al. | 340—146.1 X |
| 3,321,609 | 5/1967 | Bonney et al. | 235—154 |

MALCOLM A. MORRISON, Primary Examiner

CHARLES E. ATKINSON, Assistant Examiner

U.S. Cl. X.R.

235—153